Figure 1:
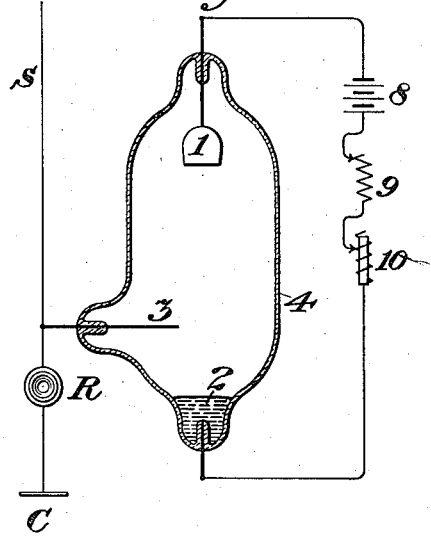

P. C. HEWITT.
METHOD OF AND APPARATUS FOR TRANSLATING ELECTRICAL VARIATIONS.
APPLICATION FILED MAR. 30, 1907.

1,144,596.

Patented June 29, 1915.

7 SHEETS—SHEET 1.

WITNESSES
Chas. F. Clagett

Peter Cooper Hewitt INVENTOR
BY
G. C. Dean ATTORNEY

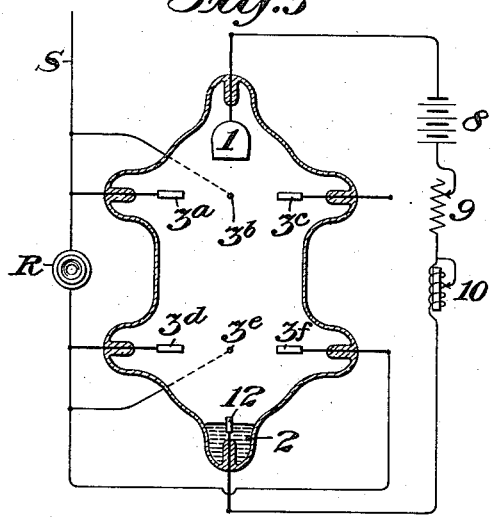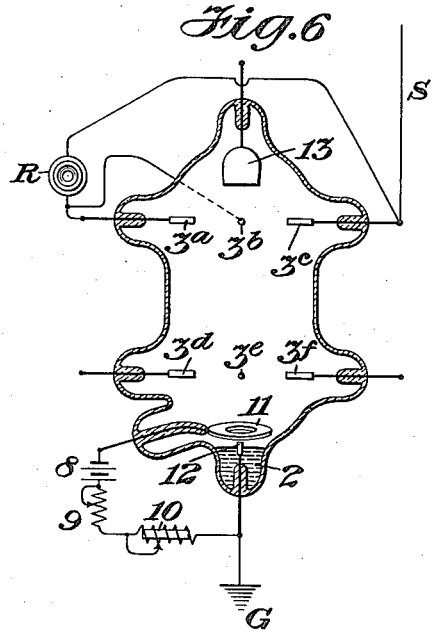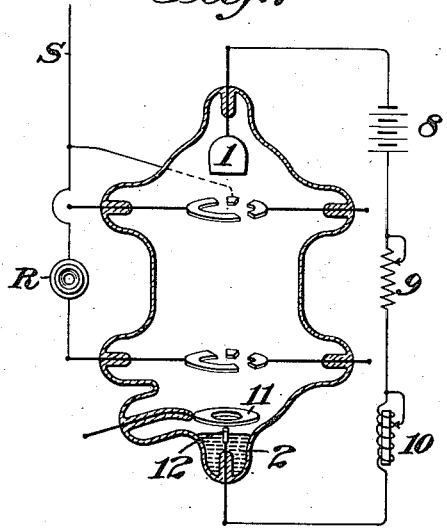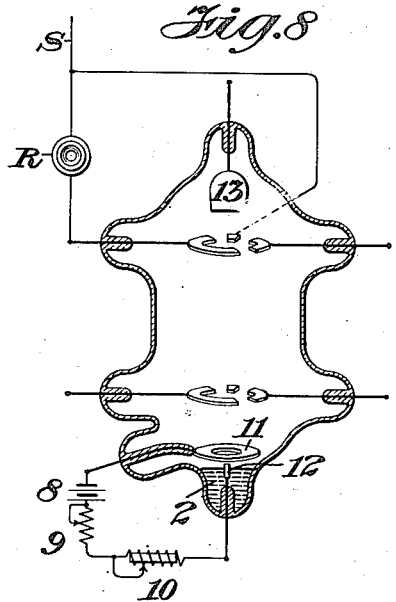

P. C. HEWITT.
METHOD OF AND APPARATUS FOR TRANSLATING ELECTRICAL VARIATIONS.
APPLICATION FILED MAR. 30, 1907.

1,144,596.

Patented June 29, 1915.
7 SHEETS—SHEET 3.

WITNESSES
Chas F. Clagett

Peter Cooper Hewitt, INVENTOR
BY
G. C. Pease, ATTORNEY

P. C. HEWITT.
METHOD OF AND APPARATUS FOR TRANSLATING ELECTRICAL VARIATIONS.
APPLICATION FILED MAR. 30, 1907.

1,144,596.

Patented June 29, 1915.
7 SHEETS—SHEET 4.

WITNESSES

Peter Cooper Hewitt INVENTOR

BY

ATTORNEY

P. C. HEWITT.
METHOD OF AND APPARATUS FOR TRANSLATING ELECTRICAL VARIATIONS.
APPLICATION FILED MAR. 30, 1907.
1,144,596.
Patented June 29, 1915.
7 SHEETS—SHEET 5.
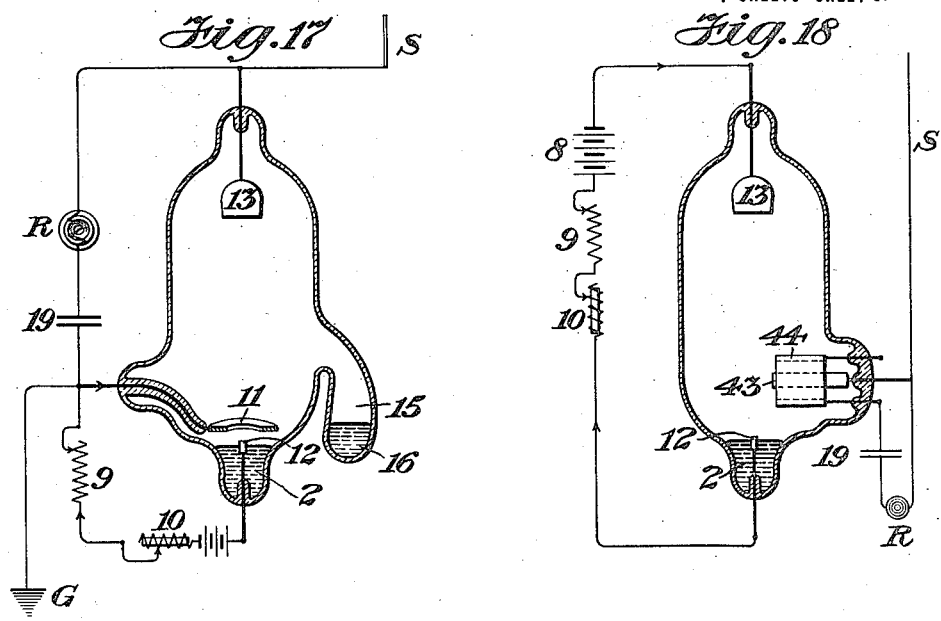
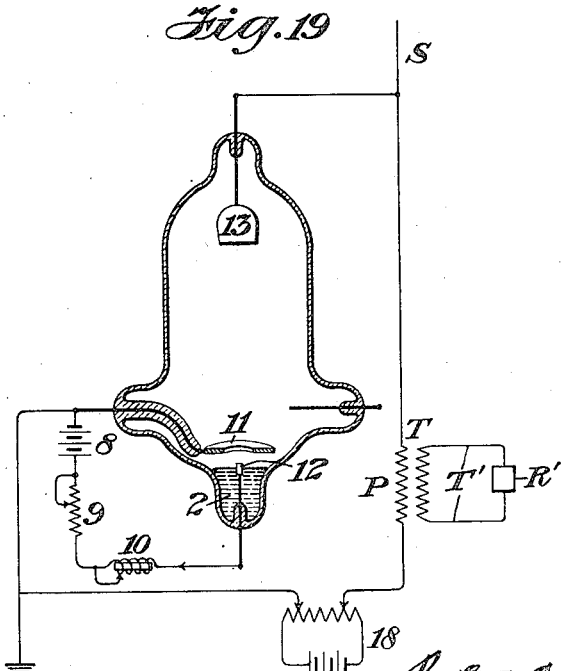
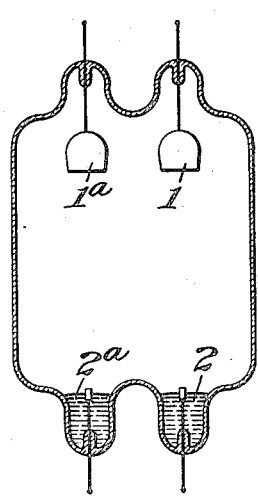
WITNESSES
Peter Cooper Hewitt INVENTOR
BY
ATTORNEY P. C. HEWITT.
METHOD OF AND APPARATUS FOR TRANSLATING ELECTRICAL VARIATIONS.
APPLICATION FILED MAR. 30, 1907.
1,144,596.
Patented June 29, 1915.
7 SHEETS—SHEET 6.
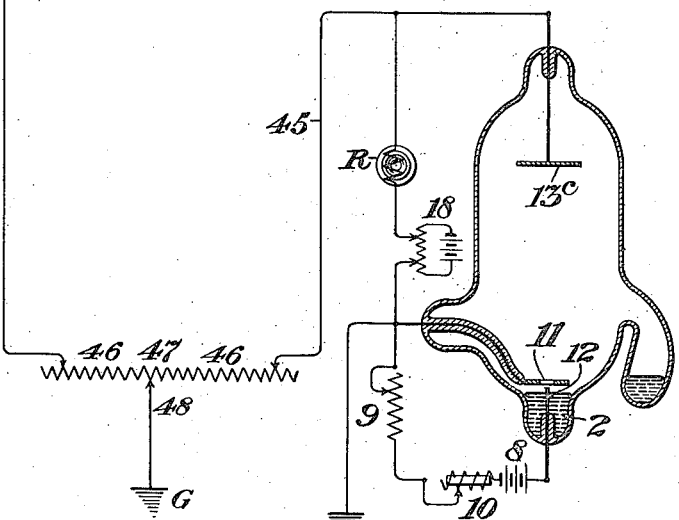
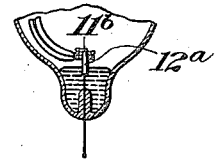
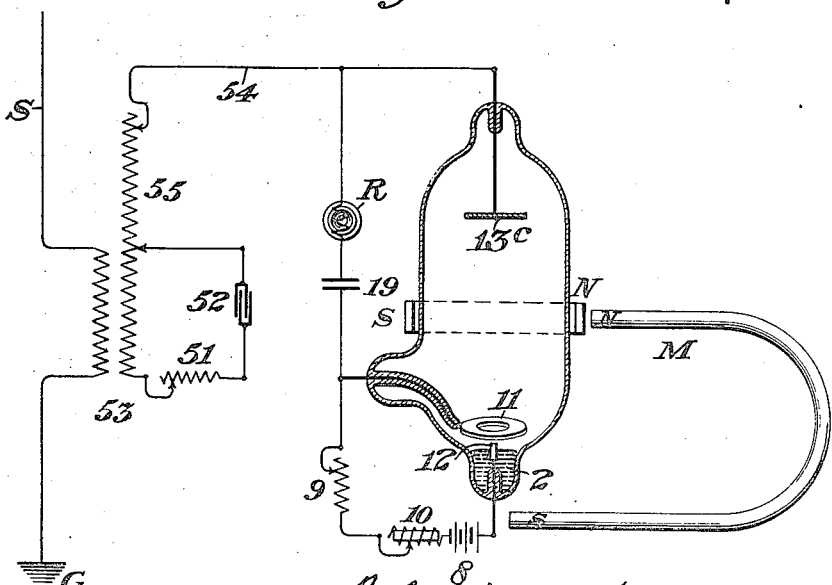
WITNESSES
Peter Cooper Hewitt INVENTOR
BY
G. C. Dean ATTORNEY.

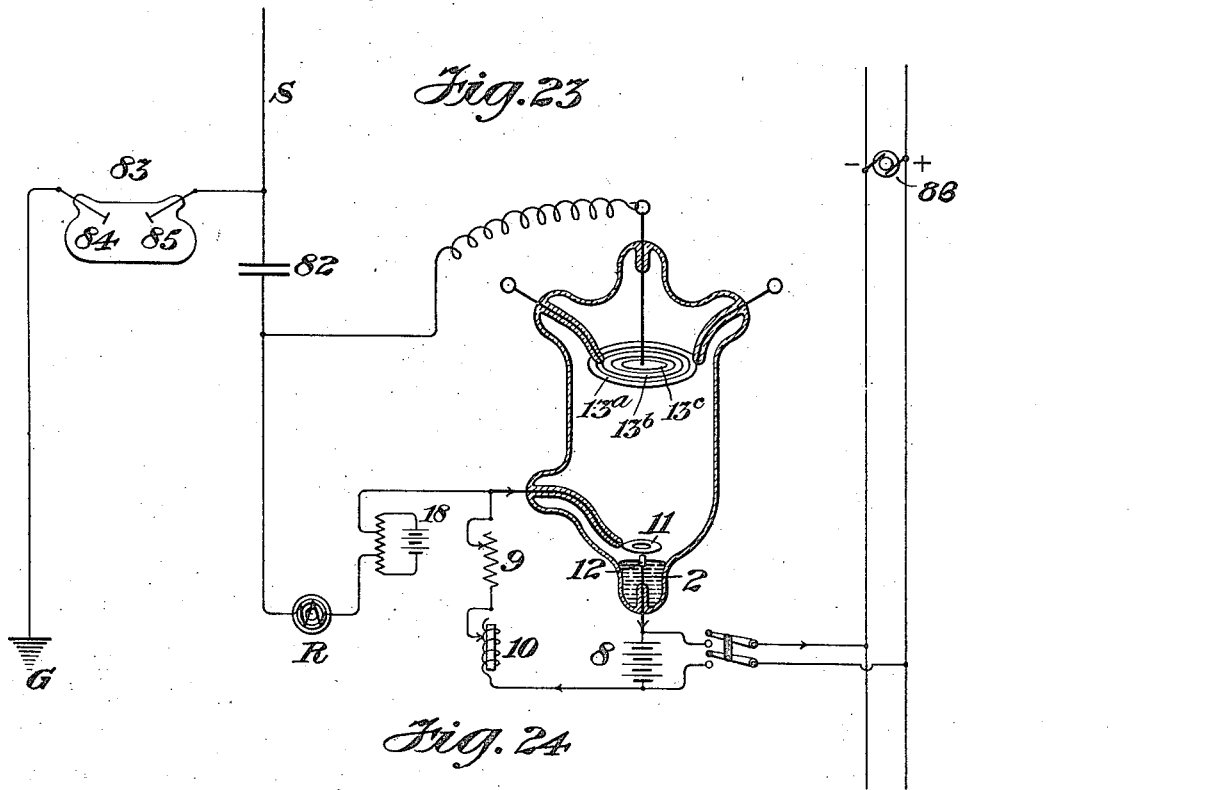

UNITED STATES PATENT OFFICE.

PETER COOPER HEWITT, OF NEW YORK, N. Y., ASSIGNOR, BY MESNE ASSIGNMENTS, TO COOPER HEWITT ELECTRIC COMPANY, OF HOBOKEN, NEW JERSEY, A CORPORATION OF NEW JERSEY.

METHOD OF AND APPARATUS FOR TRANSLATING ELECTRICAL VARIATIONS.

1,144,596.            Specification of Letters Patent.        Patented June 29, 1915.

Application filed March 30, 1907. Serial No. 365,597.

*To all whom it may concern:*

Be it known that I, PETER COOPER HEWITT, a citizen of the United States, and a resident of New York city, in the county of New York and State of New York, have invented a certain new and useful Method of and Apparatus for Translating Electrical Variations, of which the following is a specification.

My present invention involves the discovery of certain phenomena developed by the flow of electric current through a gas or vapor, and it particularly concerns the utilization of such phenomena in connection with electrical variations of all kinds and for various purposes. It is useful in connection with very rapid and very feeble electrical variations, and is particularly adapted to translate variations of potential. When used for detecting the oscillations in the receiving circuit of a space telegraph or telephone system, the results demonstrate extreme sensitiveness, reliability and durability.

My invention contemplates the employment of one or more special or auxiliary terminals, or electrodes, in operative relation to a gas or vapor carrying current, said current being supplied to the gas independently of such auxiliary terminal or terminals. The geometrical characteristics of the conducting vapor may be determined by the size, shape, etc., of a containing vessel and by the size and position of electrodes therein. The electrical characteristics of the gas or vapor are dependent upon the geometrical characteristics, upon the kind and purity of the gas or vapor, upon the nature and material of the electrodes, and upon the density of the vapor. The density of the vapor depends upon the temperature and pressure and the initial density of a given vapor in a hermetically sealed container, may be varied through changes of internal temperature. Normal or initial internal temperature is dependent upon the temperature of the surroundings. Changes of temperature during operation are dependent upon the ratio of heat generation to heat radiation. The internal heat generation is dependent upon the above mentioned electrical characteristics and upon the amount of current flowing in the vapor device. The heat radiation is dependent upon the heat radiating area and the temperature of the surroundings. Hence, in the operation of a vapor device having given geometrical and electrical characteristics of construction, the density of the vapor is controllable by regulating current flow, heat radiating area, and temperature of the surroundings.

The reactions attending passage of current in a conducting gas or vapor may be subdivided into three definite classes: (1) reactions at and near the positive electrode or anode; (2) reactions in the gas or vapor itself; and (3) reactions at and adjacent the negative electrode, or cathode, including reactions at the junction of the negative dark space with the vapor carrying current from the main positive electrode. The separate phenomena of which the reactions at the positive electrode or anode are made up, are numerous, and are chiefly modified by the position, size, and physical state of the anode; and by the purity, density, and kind of gas; and also by current density in the gas. Certain of them are sensitive to magnetic action. One of the visible reactions of the positive electrode or anode, is a luminous ball or bush which is very sensitive to magnetic action and which tends to be a source of variation. At low densities it is very sensitive to magnetic action. The reactions in the conducting vapor itself and modifications thereof, independent of the reactions near the electrodes, have been broadly stated by me. They may be modified by a magnet, especially at low densities. The reactions of the vapor column are normally stable, and for purposes of this invention, its length, the kind of gas, the gas density, and the current density are chief modifying factors to be considered and controlled. The phenomena at the negative electrode are numerous, and include two distinct classes; one class being those found at the negative electrode when it is in its primary condition, before it has been changed to what has been termed by me its "low resistance" or "broken down" state, and another class being those which exist after the negative electrode has attained the low resistance state. It is characteristic of the first mentioned class that on subjecting the negative electrode in the primary condition, to sufficient electrical stress, a certain point is reached where a leakage current may be observed under certain conditions. A modified leakage current flowing under lower stress is manifest when said electrode is present in a current carrying vapor having sufficient current density. The opposition or apparent resistance to this leakage current, is modified by the surface area of the electrode, and by the current density in the vapor adjacent thereto, and it varies in ways peculiar to itself with the nature, purity and the density of the vapor, and with the nature and condition of the electrode. It varies with the temperature of the negative electrode, and if this temperature be increased to incandescence, this resistance then reaches or comes near its limit. After the last state of resistance in the primary condition has been reached, if the temperature of the electrode be increased to such a point as to bring about a physical or chemical change of state of the electrode, while current, with sufficient backing, is passing into said electrode, the reactions will change to those of the second class; namely, those attendant upon the broken down state of resistance, and the reactions of the negative electrode will then be measured by a less drop in potential. It is often desirable that the drop over the device be as small as possible and in such case this latter state should serve best. This broken down state of the negative electrode may be attained by various expedients now well known in the art. Accompanying this change are the visible phenomena of the negative flame to which I have before called attention. The visible phenomena consist of a bright spot on the negative electrode with a flame apparently hovering over this spot. The peculiar characteristic of this flame is that it tends to lie in and along the magnetic lines of force, rather than to be twisted or distorted by them, as is usual to current passing. It tends normally to project itself perpendicularly from the surface of the electrode. A magnet may be used to modify or adjust the conditions at the negative electrode. The bright spot tends to locate itself at a meniscus of an irregularity on an electrode. The flame itself is surrounded by a dark space and when the flame is in normal position in a right line with the vapor column, the top of the flame usually marks the boundary of the dark space where it joins the luminous positive column of conducting vapor coming from the positive electrode. The flame is very sensitive to electrical variations, and such variations may be observed when looking at it. Its reactions may also be varied by a magnetic field and its reactions may be made usable in this way. When the positive electrode is arranged at comparatively short distances from the negative electrode as, for instance, when located within the dark space, there may be no luminous positive column, and the reactions at the positive are modified at certain distances from the cathode and may be rendered practically unnoticeable. The positive bush reaction may be practically eliminated by these means. The length of the vapor column is decreased so that the total voltage drop across the device is decreased, and the drop due to the positive bush may be seriously modified if not altogether eliminated. Many of the above described reactions are modified by rapid electrical variations and are useful in connection with them.

I prefer to practise my invention in connection with a vapor device supplied with current in the usual manner through two main electrodes and operating with the negative electrode in the low resistance conditions, with the attendant internal reactions made stable so as not to cause objectionable variations in the detecting instrument, although the vapor device may be operated under other conditions. A suitable reactance, preferably an inductance in series with the device, is desirable, as it tends to promote stability. Moreover, a reactance in either or both leads may serve to check the rapidly varying currents to be detected, so that the receiving or variation circuit will be less affected by the characteristics of the main supply circuit. The vapor device may be started and regulated or controlled by any known or desired means or methods, particularly those suitable for mercury vapor lamps and devices heretofore invented by me. I expose within the device, supplied with current through such main electrodes, a separate terminal or two or more terminals operatively associated with a telephone or other indicating instrument and with a source of variation to be detected. The relative positions of such terminal and of the main electrodes are of considerable importance because, other things being equal, the effects of the reactions at an auxiliary terminal of this type, seem to vary with the charge in the body of the vapor, particularly in the region immediately adjacent such auxiliary terminal. The current density in the vapor varies with the total amount of current flow between the main electrodes and also with the relative position or location of the auxiliary terminal with reference to the main electrodes and the current path between said electrodes. Hence, for given conditions, the proper current density or charge of the vapor adjacent an auxiliary terminal, may be attained by adjusting or arranging the auxiliary terminal nearer to or farther from the main electrodes and the path between them; or, where the auxiliary terminal is already fixed in a suitable position, by increasing or decreasing the amount of current flowing between the main electrodes. The latter expedient will usually have the effect of changing the density and distribution of the current in the vapor and may be availed of to a certain extent. The relation of the size of the auxiliary terminal to the current or charge carried by the vapor is important, and as a rough rule, the size should be decreased when the charge in the vapor is increased to obtain approximately the similar effects. And, further, if it is desired to vary the effect, increase of size in the area of the auxiliary terminal will have an effect somewhat analogous to increase of charge or current density in the body of vapor adjacent thereto. In practice these variables may always be adjusted to insure the best conditions of operation for a given character of signal or other received energy, by noting the good or ill effect of adjustment or change in a given direction of either of the above factors and continuing, discontinuing, or reversing the direction of said adjustment or change until the best effects are obtained. It is not necessary in all cases to make all of these factors variable. By having predetermined proper conditions and areas for certain work, a single device may be constructed which will embody the features and relations desired. By increasing the main current when receiving even faint signals, the volume of the signal may be amplified in many arrangements of this device, and this may be continued up to the point where they begin to be obscured by other variations developed. For instance, in the case of a vapor device of a type hereinafter described, wherein the main positive electrode is located, say, about 1/4 to 3/8 of an inch from the surface of the mercury of the main negative electrode and the auxiliary electrode is, say 5 inches away from and above the nearest of said main electrodes, it may be that the best electrical condition of the vapor adjacent the auxiliary electrode, for a given character of signal or received energy, may be attained with approximately 1.5 amperes of current flowing between the main positive and negative electrodes; whereas if said auxiliary electrode is 6 or 7 inches away from said main electrodes, the main current flow might have to be increased to approximately 2 or 3 amperes in order to get approximately equivalent conditions. Whatever type of device be employed for maintaining the supply of current in the vapor, such supply should be independent of the auxiliary electrode used for detecting purposes. An auxiliary electrode, because of its position or electrical connections, may have a tendency to be a positive or a negative electrode with reference to the vapor, or, being maintained at a neutral point, as by a source of counter electromotive force, or by a condenser which may be used as such, it may under certain conditions tend to act as either, or alternately, as both. For some purposes it is preferable that it be arranged so as normally to have no current flowing either from or to it, except such currents as are the result of the action of the electrical variations to be detected, and in case it is desired that the device should have a rectifying action, the auxiliary electrode should tend to oppose a prohibitive barrier to the passage of current from the vapor into it. This action seems to be more complete when the current flow in the vapor adjacent to it is at or near a minimum and its surface area is not too great. There may be a normal current flow either to or from an auxiliary terminal, but such flow may increase internally originated disturbances which tend to mask the effect when feeble variations are to be detected, even when such current flow is checked by a condenser or counterelectromotive force. There seems to be some difference in the phenomena caused by such tendency to normal current flow through the auxiliary electrode, according as the latter has the ability to act as a cathode to receive current from the vapor, or as an anode to deliver current to the vapor. When having the ability to act as a cathode to allow current flow into the auxiliary electrode, in many cases increase of such flow seems to directly decrease sensitiveness, and may produce disturbing indications, whereas when tending to act as an anode, too great increase of current flow apparently tends to obscure the observable indications and may mask the same under a disproportional increase of internally produced disturbances. Such disturbances may be objectionable or they may in some case be made to assist in detecting certain kinds of variations. Hence, when the arrangement is such that the auxiliary electrode normally tends to act as an anode with current normally tending to flow from it, its area, shape, location, and material should be such as will not give rise to an objectionable intensity of internal disturbing variations, unless it is desired to make use of them, and it is usually better that its action should tend to be that of a prohibitive cathode when used in connection with rapidly varying currents. In some cases desirable effects are obtained where the auxiliary electrode tends to act as an anode having a slight normal current flow from it to the vapor, the quantity of such current being perhaps of the order of one-tenth to, say, two milliamperes. In such case the indications from the received energy seem to be more intense up to a point where the increasing current causes disproportionately increasing disturbing conditions. When any condition of tendency to current flow to or from the auxiliary electrode suitable for receiving signals, has been attained, as, for instance, where there is a normal flow of the order of 1/10 to 2 milliamperes, as indicated above, or more, from such terminal, electrical conditions thus established at the surface of the terminal may be considered for some purposes, as if still existing when a counter electromotive force or condenser is interposed in the circuit, although the normal current flow is thereby checked. For most wireless work, I prefer to use a small condenser or a counter connected potentiometer.

Devices of the character desirable for maintaining the current carrying vapor in the desired conditions, are themselves essentially unstable, irrespective of whether there is current flow to or from an auxiliary terminal; that is to say, the normal internal variations of apparent resistance particularly at the electrodes, are such as to cause electrical fluctuations, which cause very marked responses at an auxiliary electrode and in the indicating instrument associated with it, when the negative electrode is in the low resistance or broken down state. For this reason, it is essential to the best operation of my invention for delicate work, that the normal, internally originated variations be made as small as possible and affect as little as possible, an electrode which is in operative relation to the indicating instrument. To this end, the internal causes of such variations may be largely suppressed or counteracted, and the auxiliary electrode or electrodes may be situated so as to be but little affected by them, the indicating instrument being connected to the apparatus in such manner as not to be seriously affected by such variations. The indicating instrument may be employed with other devices serving to cut off such variations; or, if desired, all of these expedients may be employed.

In the cases where the main negative electrode is a liquid electrode in the low resistance condition, the wandering tendency of the flame may be fixed in various ways, as, for instance, by having a projection from the electrode, adapted to be wetted by the liquid and extending above the surface thereof, somewhat after the manner shown in my prior Patent No. 758,650. By fixing the flame, electrical variations due to the phenomena at the negative electrode, may be modified and rendered practically stable.

The reactions at the positive electrode are normally in an unstable state and give rise to rapid electric variations, which when heard in a telephone are rumbling, rattling, crackling sounds, and may, under certain conditions, produce clear musical notes. One means of rendering the reactions at the main positive electrode substantially stable, is to bring such main positive electrode in close proximity to the main negative electrode. In such case, the visible phenomena at the main positive electrode and the voltage drop, are modified and largely suppressed, and the attendant reactions may be so rendered practically noiseless to a telephone at an auxiliary electrode.

The size of the positive electrode is important with reference to the heating effect on it and also with respect to the bush reaction, and for most purposes it should be of sufficient area to pass the desired maximum current without becoming unduly overheated but it should not be too large on account of the bush reaction. It may be designed to be highly heated and its temperature may be made to affect the reactions at the negative electrode, as well as its own.

The vapor column, considered by itself, rarely presents any sources of irregular or detrimental electrical variation. It is desirable to use means to maintain the current in the vapor normally constant and uniform in quantity and in distribution.

The internal variations may be modified by a magnetic field external to the device, the exact position and distance of the magnet suitable for given conditions being usually determined by a few trials. The magnetic field thus employed may be made to vary the internal resistances or reactions, and will often increase the sensitiveness of the device. The desired direction and distribution of the lines of force of the field may be established by proper design and location of a single magnet, or a plurality of magnets may be used to establish a resultant field. With a ring positive electrode, it is usually desirable to have the lines of force some where about 45 degrees from the normal direction of the negative electrode flame and with a disk positive electrode approximately parallel with such direction.

The circuits herein described, the auxiliary terminal or the described above provisions for suppressing internally originating fluctuations and disturbances, are particularly desirable for and may one or all be used in connection with means for receiving, rectifying, relaying, magnifying, detecting, or otherwise translating electric variations, and more particularly, feeble variations, such as telephonic currents or the received energy from electromagnetic waves of the kind used for wireless telegraphy or telephony.

I have discovered that when one or more separate terminals are projected into a device having a vapor, carrying current which is supplied independently of such terminal, the reactions in the device are most sensitive to electric variations and that by connecting such terminal to a telephone receiver, siphon recorder, or other sensitive indicating instrument, electric variations cause marked response on the indicating instrument and are rendered audible in a telephone. The loudness or intensity of the indications produced by the received energy, increases with increase of received energy, and commercial wireless messages from great distances have been heard from a commercial telephone receiver, located many feet away from the observer. Two or more auxiliary terminals may be connected in parallel with each other and to a telephone or other indicating instrument. The circuit from the auxiliary terminal need not be closed. A circuit from the latter to ground or to a capacity or to one of the main electrodes or to another auxiliary terminal, may be used. In the case of wireless telegraph signals, the variations may be operatively applied to the vapor device by merely connecting the receiving circuit to a small capacity area located in the neighborhood of the device; as, for instance, a metal plate a foot square arranged parallel with the side of the vapor device and, say, six inches or more from it. Two auxiliary terminals may be connected in series with each other through the indicating instrument. Varying results may be obtained when the indicating instrument is connected between two or more auxiliary electrodes, by having them dissimilar as to position, surface, or some other slight difference of electrical condition or relation. By suitable selection of the auxiliary electrodes, the latter arrangement becomes characteristically free from disturbing variations and when a condenser is serially interposed, a most delicate indicating instrument fails to be seriously disturbed by interior disturbing variations.

In all forms shown herein the conducting gas or vapor is inclosed in a suitable container preferably having three or more electrodes. The electrical reactions at the various electrodes and in the conducting medium may be thus caused and controlled as desired, to enable the development of suitable reactions within the medium itself for the desired purposes and to make possible the modification and control of the reactions. The temperature and density of the gas or vapor may be controlled in any desired way, as by determining the area and disposition of the outer radiating surfaces of the container or by the use of suitable expedients for increasing or decreasing the heat absorbing or heat imparting power of the surroundings, such as jacketing or immersing in heating or cooling baths parts or all of the device.

In all of the forms shown herein, the conducting medium is referred to as a gas or vapor medium contained between electrodes in an hermetically sealed vessel, but similar circuit connections may be made serviceable in connection with other mediums having similar reactions. A pure gas is preferably, however, since it tends to insure uniformity of the reactions. I prefer to use mercury or mercury vapor in an hermetically sealed vessel or container. The container and any solid electrodes therein, are preferably of such material as not to yield gases under the conditions of operation. The methods of cleansing and evacuating such devices by washing with mercury vapor and exhausting the same while subjected to the action of heat and of the electric current are now well known in the art.

As hereinbefore indicated, the means for starting and maintaining current flow between the main electrodes of the vapor device may be any of those commonly known in the art as suitable or desirable for such purpose.

In the accompanying drawings I have shown various forms of vapor devices supplied with one or more auxiliary electrodes connected with an indicating instrument in various ways. The variety of arrangement disclosed is such as will enable those skilled in the art to understand the nature of my discovery and to arrange modifications adapting the same to further uses.

Figure 2:
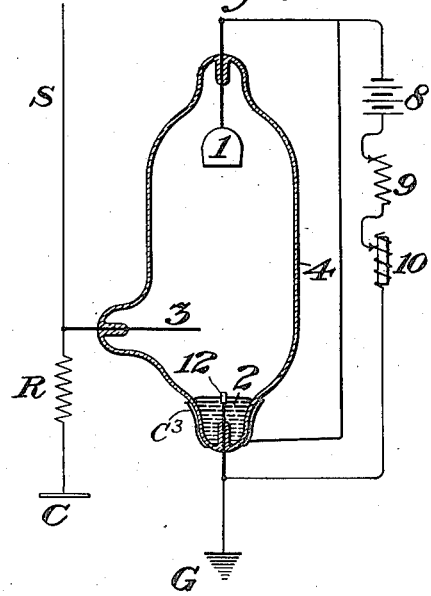
Figure 3:
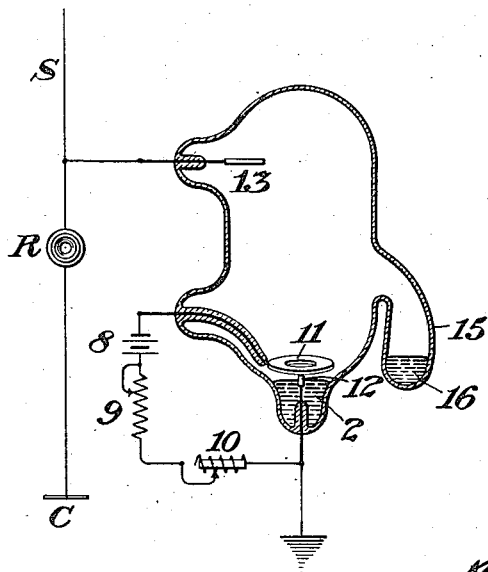
Figure 4:
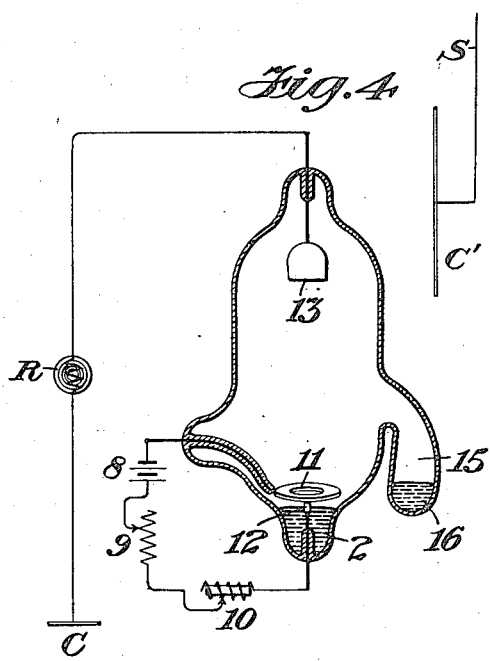

In the drawings: Figure 1 shows a simple form of my device in vertical section and simple circuits therefor in diagram. Fig. 2 is a similar view showing means for rendering the reactions at the main negative electrode more stable. Fig. 3 is a similar view of a modification wherein the positive electrode is arranged close to the negative electrode in such manner as to render the reactions at the positive electrode more stable. Fig. 4 is a similar view showing the auxiliary electrode at the top of the container, and the source of variations as operatively related to the device by means of a capacity area. Figs. 5, 6, 7, and 8 show modified devices with multiple auxiliary electrodes and various circuit arrangements in diagram. Figs. 9, 10, 11, and 12 show two ring electrodes adjacent the negative electrode. Figs. 13, 14, 15, and 16 illustrate typical indicating circuit variations, all other features being identical. Fig. 17 shows further typical indicating circuits. Fig. 18 illustrates an indicating circuit connection between concentric auxiliary electrodes. Fig. 19 illustrates an arrangement wherein the indicating circuit contains the primary of a transformer. Fig. 20 shows a vapor device having two positive and two negative electrodes, which may be connected up in a multiplicity of ways hereinafter referred to. Fig. 21 illustrates a special form of the device wherein the positive electrode is adapted to heat a projection from the negative electrode. Fig. 21$^a$ is a detail sectional view of a modified arrangement of main electrodes. Fig. 22 illustrates a vapor device associated with a magnet and arranged in shunt to the condenser of a close tuned or resonant circuit inductively associated with a primary source of variations. Fig. 23 illustrates a special form of vapor device having three concentric electrodes of different areas at the top of the device and certain connections to be referred to. Fig. 24 illustrates a vapor device having a disk as the positive electrode and a plurality of permanent magnets arranged to modify the internal conditions and reactions.

In various of the figures of the drawings, electrodes of thin material having various outlines, are shown as viewed from a point above the planes of said electrodes, in order to show the structure more clearly. While any one or more of these electrodes may be arranged at various, similar or different angles, it is to be understood that these electrodes may be and preferably are arranged with their flat surfaces lying in planes at right angles to the axis of the vapor device. In either case, the device is preferably normally operated in a vertical position, but may be and frequently is operated in a tilted position as desired, in order to vary internal conditions for particular purposes or conditions.

In the various figures of the drawings, the specific devices embodying my invention comprise main positive and negative electrodes, one or more auxiliary electrodes, and a suitable container. The main electrodes are supplied with current from a suitable source, preferably a direct current source, indicated in the drawings as a storage battery. This supply circuit is provided with suitable regulating devices, including preferably an adjustable ohmic resistance and an inductance which is also preferably adjustable. The ohmic resistance and the inductance may be more or less embodied in the same device, but are preferably separate. Suitable receiving and indicating circuits are operatively associated with the auxiliary electrode.

Like parts have been indicated by like reference characters on the various figures wherever this is possible without liability to cause confusion.

Referring more particularly to Fig. 1, the positive electrode 1 may be of any known or desired material suitable for the purpose, such as iron, platinum, carbon, or other conducting material. The particular cup shaped electrode shown in this and other figures, is preferably of the same material, size, and shape as the positive electrode now in general use in the Cooper-Hewitt lamps. The negative electrode 2 consists of a body of conducting liquid preferably of mercury. The auxiliary electrode 3 is preferably a solid conductor of iron, platinum, carbon, or other suitable material, though it may consist of a body of conducting liquid, such as mercury, if desired. The container 4 is preferably of glass, preferably hermetically sealed and preferably having a high vacuum when cold. It may be of any suitable or desired size, and may be conveniently made about 2-1/2 to 3 inches in diameter and about 5 or more inches in height. A device of such diameter and 7 inches in height will have a current carrying capacity through the main electrodes up to 4 or 5 amperes at pressures of, say, 7 to 25 volts, and will have ample heat radiating area. The source of current supply is shown at 8, an adjustable resistance at 9, and an adjustable inductance at 10. The supply circuit is thus capable of regulation for purposes of controlling the amperage through the lamp and for steadying the same to normally uniform values. The auxiliary terminal 3 is sensitive to the electrical variations to be detected and these are operatively applied to the device from any suitable source of variation, as, for instance, a receiving wire S of a space telegraph or telephone system brought in proximity to the device or connected directly to the auxiliary terminal. It will be understood that the variations to be utilized, may be from other sources and may be of comparatively low frequency and greater amperage. Where the variations to be utilized are feeble or rapid, it is desirable to connect the supply wire S to the auxiliary electrode 3 in such manner that there shall be little capacity or impedance in the supply circuit leading to the auxiliary electrode. The detecting circuit is preferably arranged to have a suitable value of impedance, that furnished by a telephone receiver serves well, and a telephone having a resistance of 500 to 2000 ohms is frequently found suitable for the purpose of wireless telegraphy. In case the impedance is the primary of a transformer, the inductance and resistance may be selected to suit, as desired. The receiver or indicator circuit R connected at one end to an auxiliary electrode, may be connected at the other end to a capacity, or to the main positive or negative electrode or in a multiplicity of ways hereafter more fully referred to. In Fig. 1 it is shown connected to a capacity area C, which for space signaling purposes need not be very large. A ground connection G is sometimes desirable, but not always necessary, and may be made by connection from a main electrode, as in Fig. 3, if desired. Where the main direct current supply is from a commercial lighting circuit, such circuit may be utilized as a capacity or ground, as in Fig. 23. The vapor device shown in Fig. 1 is useful for many purposes, but the internally originated disturbing variations at the electrodes, due to the passage of the current, are manifest at the auxiliary electrode and tend to obscure its action when minute variations are to be detected.

Fig. 2 shows a device similar to that in

Fig. 1, but provided with one of the various possible means for lessening the internally originated disturbing variations, by rendering the reactions at the main negative electrode more stable. This result is accomplished by arranging a projection 12 extending above the surface of the mercury 2 and wetted thereby, after the manner hereinbefore referred to. A platinum wire projecting a short distance and having a diameter of .045 inch, serves well for this purpose, for currents of from 1-1/4 to 2-1/2 amperes or even more.

Fig. 3 represents a similar vapor device having the reactions at the negative electrode rendered stable in the manner just described, and embodying also a means for rendering stable the reactions at the positive electrode. In this form the positive electrode 11 is brought into close proximity to the negative electrode and arranged in the form of a ring symmetrically surrounding the projection 12 of the negative electrode, above and preferably parallel with the surface of the mercury 2 and preferably slightly above said projection. If the ring is used in the form of a flat disk of iron 1-1/8 inches in external diameter and 1/4 inch or less in internal diameter, it will pass 2-1/2 to 3 amperes of current without becoming unduly heated. The internal diameter of the ring should not be too great with respect to its distance from the projection 12, for otherwise there may be a tendency to unstable reactions giving rise to disturbing fluctuations. Ring electrodes of the above specified sizes, however, carrying currents as described, are very suitable for the purpose, but this electrode may be varied in size and shape and may be a disk or other shape. A convenient method of determining or adjusting the distance of such a positive electrode from the surface of the mercury consists in providing the container with a pocket 15 adapted to contain an extra supply of mercury 16. In such a device the desired amount of mercury may be poured off from the negative electrode into the pocket, or vice versa. In this form of device the starting may be conveniently effected by shaking the device so that the mercury of the negative electrode momentarily comes in contact with the positive electrode, thereby making and breaking a bridge. With the above described arrangements, the visible phenomena at the main positive electrode and its resistances are modified and largely suppressed and the attendant disturbing reactions are made practically unnoticeable so far as concerns their effects at the auxiliary electrode and in the indicator connected thereto. The device may be operated at a lower potential than that of Fig. 1 and it has a much greater current capacity, the latter being limited, in practice, mainly by the size and fusibility of the positive electrode. The heating effect at the positive electrode is less as the surface of the positive electrode is increased, and this arrangement may be used to carry current up to 5 amperes at a voltage of 7 to 10 or 12 volts, depending upon the characteristics of the particular device. The operation of this form of device, under varying conditions, seems to vary with the position of the positive electrode with respect to the negative electrode, particularly for positions varying from barely out of contact with the surface of the mercury to, say, 5/8 inch or more from the surface of the mercury.

In Fig. 4 the wireless antenna or other source of variations to be detected or otherwise utilized, may be connected directly to the auxiliary terminal 13, but is shown as being brought into operative relation to the vapor device by being connected to a capacity area $C'$, arranged near the container. This capacity area may be a metal or tin foil plate a foot or so in diameter and it may be very close to the container or it may be located some inches or even some feet away.

In the arrangement shown in Fig. 3, the auxiliary electrode 13 is comparatively small in area and is located in the side of the container. For most purposes, a larger auxiliary electrode 13, located at the top of the container as shown in Fig. 4, is preferable. This auxiliary electrode may be a cup shaped electrode of the same material, size, and shape as the main positive electrode of Fig. 1, which, as I have stated, is like that now in general use in the Cooper-Hewitt lamps. For some purposes a flat disk such as shown at $13^c$, Fig. 23, is preferable. The current density in the vapor adjacent such auxiliary electrode may be adjusted by changing the current flow between the main electrodes.

In Figs. 5, 6, 7, and 8, I have shown various forms of container provided with main electrodes and with a considerable number of auxiliary electrodes located in different parts of the container. In Fig. 5 the main electrodes are shown at opposite ends of the container, like those in Fig. 1, but instead of only one auxiliary electrode, there are eight similar electrodes, $3^a$, $3^b$, $3^c$, etc. The figure being a sectional view shows only three of them in a single plane transversely of the vapor column and near the positive electrode 1, and three more in another plane parallel with the first, but nearer the negative electrode. In Fig. 6 the arrangement is the same, except that the device is provided with a ring electrode 11, which is utilized as the main positive electrode, after the manner described in connection with Figs. 3 and 4. In this arrangement, the eight auxiliary electrodes are arranged in planes outside of the direct path of current flow between the main electrodes and at different distances therefrom. In this figure the electrode 13 at the top of the container may also be used as an auxiliary electrode. In Figs. 7 and 8 the arrangements are respectively somewhat similar to those of Figs. 5 and 6, the principal difference being that in Figs. 7 and 8, the electrodes in the same plane are of different sizes. In Fig. 7 the ring electrode 11 may be used as an auxiliary electrode and in Fig. 8 the cup shaped electrode 13 at the top of the container may be used as an auxiliary electrode. In these Figs. 5, 6, 7, and 8, any one of the electrodes may be used as a single auxiliary electrode, in connection with any desired arrangement of indicating circuit, as, for instance, after the manner illustrated in Figs. 1 to 4; or said auxiliary electrodes may be combined in a multiplicity of ways hereinafter more fully set forth. As heretofore explained, there is a desirable current density for the vapor adjacent the auxiliary electrode, which is most suitable for given conditions, and with devices affording electrodes of such different location and such different areas, a wide range of selection is possible for each value of current amperage between the main electrodes. This range of selection is vastly increased by the ability to adjust such amperages to various desired values.

Figure 9:
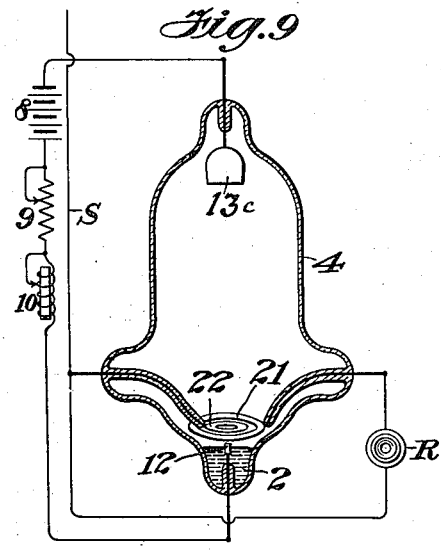
Figure 10:
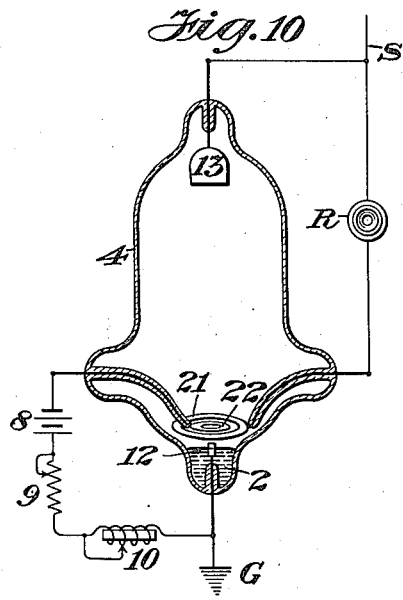

Fig. 9 shows a container having a cup shaped electrode at the top, a liquid negative electrode and projection at the bottom, and just above the latter two concentric ring electrodes 21, 22 in the same plane. The cup shaped electrode 13$^c$ may be used as the main positive electrode, and other or both of the ring electrodes as auxiliary electrodes, or, as shown in Fig. 10, the inner ring electrode 21 may be used as a positive electrode and the outer ring electrode as an auxiliary electrode.

Figure 11:
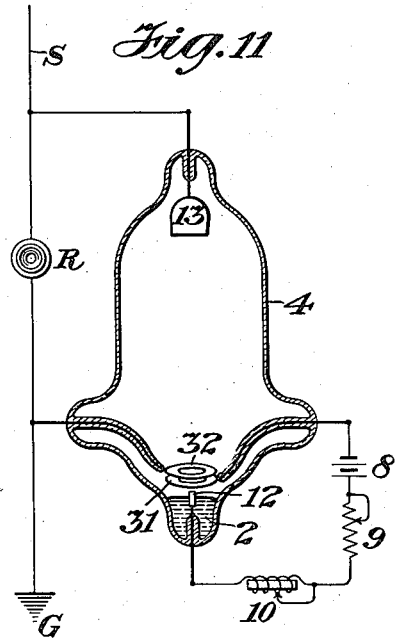
Figure 12:
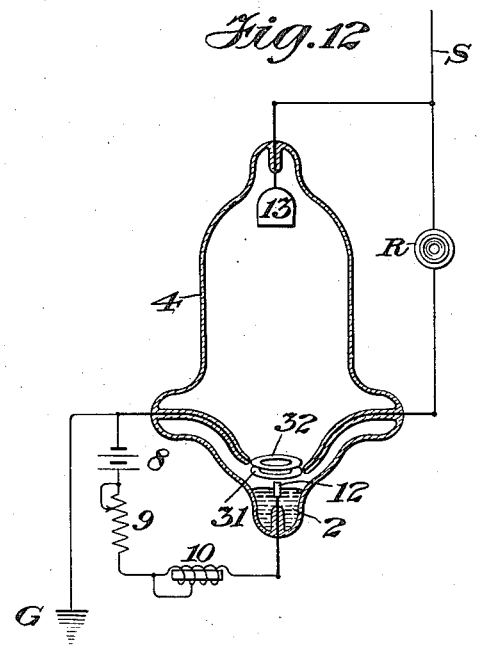

In Figs. 11 and 12 there are two ring electrodes 31, 32 located one above the other. There is also a cup shaped electrode 13 at the top. Either one of the ring electrodes or the cup shaped electrode may be used as the main positive or as auxiliary electrode or electrodes. When the upper ring electrode 32, Figs. 11 and 12, is not used as a main electrode, it appears to serve some useful purpose with reference to the reactions occurring at the main electrodes. One apparent effect is that it tends to prevent adherent deposits on the walls of the container, which otherwise frequently occur and which appear to be caused by exfoliations from the point 12 of the negative electrode.

Figs. 17, 18, 19, and 20 show various forms of vapor device with a multiplicity of solid electrodes. It will be understood that in all forms, any solid electrode having sufficient area to carry the current, may be used as a main positive electrode, and any one or all of the others used as auxiliary electrodes.

For instance, it will be understood with respect to the form shown in Fig. 20, that either of the lower electrodes 2, 2$^a$, may be used as a main negative electrode, either of the solid electrodes 1, 1$^a$, or the remaining liquid electrode being used as the main positive electrode. In such case, one or both of the other two electrodes—i. e. two solid electrodes or one solid electrode and one liquid electrode, may be used as auxiliary electrode or electrodes in connection with any of the indicator circuits hereinbefore or hereinafter indicated.

Figure 13:
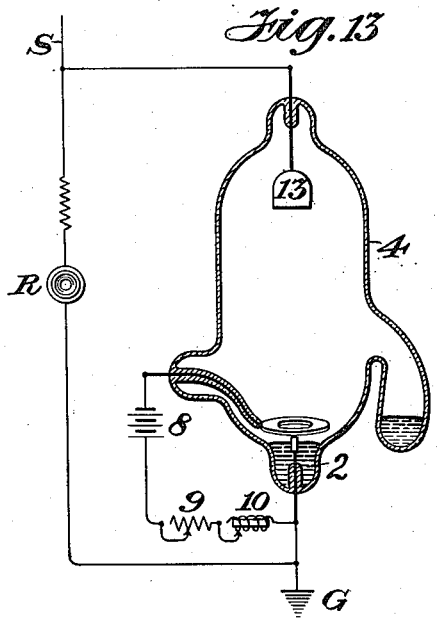
Figure 14:
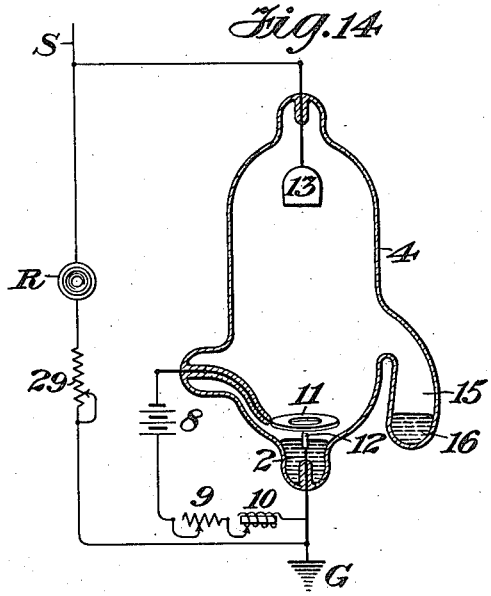
Figure 15:
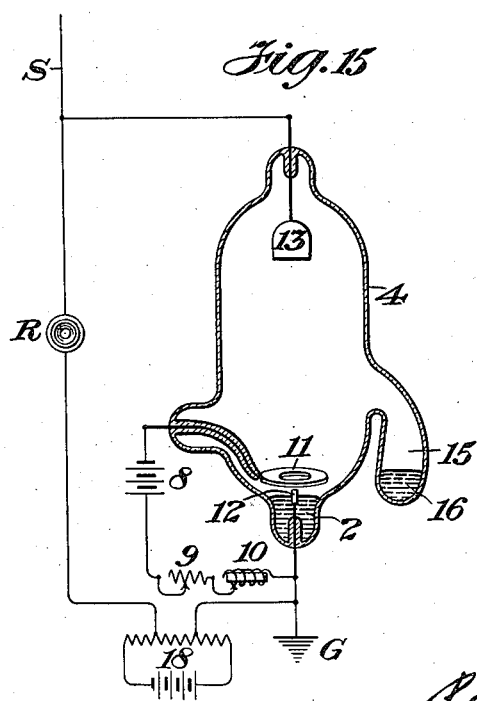
Figure 16:
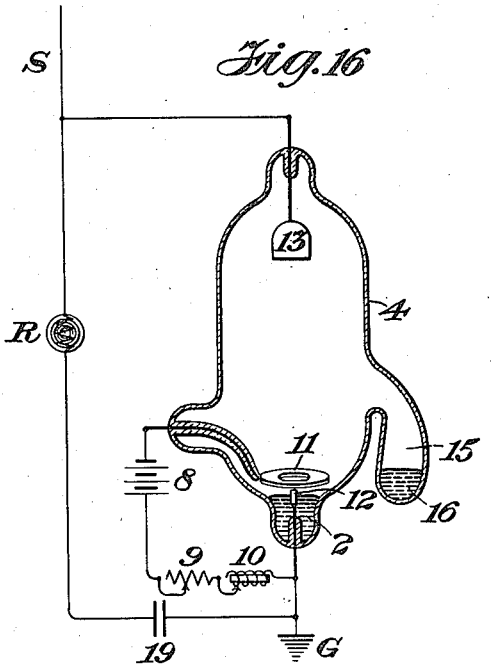

As will be evident from the detailed statement of the nature and objects of my invention, the vapor device is extraordinarily sensitive in a multiplicity of ways to the electrical variations of widely varying characteristics of frequency, quantity, etc., and the circuits suitable for utilizing or indicating these variations are very numerous. As has been explained in connection with the simple circuit in Figs. 1 to 4, the source of variations may be connected or brought into operative relation to the device in such manner that said variations reach the auxiliary electrode, preferably without being subject to any considerable impedance or reactance. The indicator circuit is preferably directly connected to the auxiliary electrode and to the indicating instrument. Such circuit may be connected at the other end to a capacity or a ground, or to the main negative electrode, or the main positive electrode, or to another auxiliary electrode, or to several auxiliary electrodes in parallel. Furthermore, the auxiliary electrode may consist of several separate electrodes connected in parallel and used as if they were a single auxiliary electrode. In Fig. 13 the indicating circuit is from the auxiliary cup shaped electrode 13 at the top of the container, through the indicating device to the negative electrode 2, as shown. The impedance, particularly inductance, for the circuit of the receiving device exercises an important function, and the best value thereof should be ascertained by trial when the device is to be used for particular purposes. In Fig. 13 the indicator R may be an electromagnetic telephone receiver having sufficient impedance for the particular purpose in view, for instance, 100 to 2000 ohms resistance. Fig. 14 illustrates an additional adjustable impedance which may be an inductance coil 29. This is desirable where the indicator itself has small impedance, either because of the character of the winding used, or because of the nature of the device, as where the indicator is a condenser telephone receiver. It will be understood that such adjustable impedance may be used in any of the circuits shown herein, but it is usually more desirable that it be in the receiving instrument. In Fig. 15 the electromotive force across the indicator circuit from the auxiliary terminal to the main negative electrode is more or less counter-balanced, or if desired, over-balanced by the potentiometer 18 shown. The latter may be adjusted to cause slight current flow to or from the auxiliary electrode, and this device may be used in connection with the other devices and circuits shown herein. In Fig. 16 the arrangement of circuits is the same, except that a condenser 19 is used as the source of counter electromotive force, in place of the potentiometer. Such condenser is a very practical, reliable and useful device where no normal current flow in the auxiliary terminal, is desired. The functions of these various devices in permitting or controlling or preventing slight normal current flow to or from the auxiliary electrode, has been heretofore explained. All of the connections shown in Figs. 13, 14, 15, and 16 may be duplicated with respect to an indicator circuit connection from the auxiliary electrode extending to the main positive electrode, instead of to the main negative electrode. In Fig. 17 I have shown such connection from the auxiliary electrode 13 to the main positive electrode 11, a condenser 19 being interposed between the indicator and the main positive electrode; but it will be understood that a potentiometer may be used or a simple impedance may be used, or the circuit may be a simple circuit containing only the indicator. Where a condenser is used after the manner shown in Fig. 17, it is preferable that such condenser be between the indicator and the positive electrode, rather than between the indicator and the auxiliary electrode. The proper value of the capacity to give the best results for given conditions is preferably determined by trial of various values of capacity, and when the most suitable value has been thus determined, a non-adjustable condenser of such capacity may be substituted. The latter is particularly convenient and efficient for wireless indications. A condenser of 1/4 microfarad may serve well, and one of much less capacity may be used for feeble signals. The most desirable capacity for this condenser seems to depend upon the length of the wave trains and the spark frequency, but a condenser of suitable fixed capacity will usually satisfy practical requirements.

With this general description of the typical circuits of Figs. 1, 2, 3, 4, 13, 14, 15, 16 and 17, it will be understood that the more complex devices of Figs. 5, 6, 7, 8, 9, 10, 11, 12, 18 and 20 may be connected up in a multiplicity of ways, all of which are operative and various of which are best suited to particular conditions.

Referring to Fig. 5, the main circuit is from the main electrode 1 to the main electrode 2, and the indicator circuit is from the electrodes $3^a$ and $3^b$ connected in parallel to act like a single electrode, through the indicator to electrodes $3^d$, $3^e$, $3^f$, connected in parallel to act as the other terminal of the indicator circuit. In this arrangement the two upper auxiliary electrodes have an area related to the combined area of the electrodes, as two is to three, the upper two electrodes being located in the container differently from the lower three electrodes.

The circuit shown in Fig. 6 illustrates the fact that where the main electrodes are close together at the lower end of the container, an indicating circuit may be operatively employed by connecting two electrodes in a single transverse plane with one electrode of the same area, in the same plane, the difference in area between the two electrodes and the one electrode resulting in sensitiveness. In Fig. 7 a small electrode in an upper plane of the container is connected through the indicator with a large electrode in a lower plane. In Fig. 8 a small electrode is connected through the indicator with a larger electrode in the same plane. The multiplicity of possible permutations and combinations of various locations and the values of electromotive force from one electrode to another and of the values of main current flow in these devices, is so great as to render specific detailed description impractical when the breadth of utility of the device is considered. It is sufficient to say that the widest range of selection is possible.

Fig. 9 shows the indicator circuit connected between two concentric auxiliary ring electrodes 21, 22 closely adjacent the main negative electrode, the main circuit being through the cup shaped main positive electrode 1 at the top. In Fig. 10 the inner ring electrode is the main positive electrode and the indicator is connected between the cup shaped upper electrode 13 and the outer ring electrode 22. In Fig. 11 the indicator is connected between the upper cup shaped electrode 13 and the ring electrode 32 above the main positive ring electrode 31. In Fig. 12 the indicator connection is from the upper cup shaped auxiliary electrode 13 to the lower ring electrode 31 used as the other auxiliary electrode, the upper ring electrode 32 being used as the main positive electrode.

A modification of concentric electrodes is shown in Fig. 18 where the upper cup shaped electrode 13 is the main positive electrode and the indicator is connected between a small auxiliary electrode 43 and a larger cylindrical electrode 44 concentric therewith. The condenser shown at 19 may be used or not as desired.

In Fig. 19 the indicator circuit contains a primary P of a transformer T and is connected between the auxiliary electrode 13 at the upper end of the container and the main positive electrode 11. The secondary of the transformer may be connected in circuit T' with any desired translating device R'. In case a siphon recorder is used in this secondary circuit, the circuit or the recorder may be tuned to the frequency of the impulses received therein, which, in the case of spark telegraphy, may be, in some cases a group or spark frequency. In an arrangement such as shown in Fig. 19, the normal current flow through the auxiliary electrode was found to be about 1/10 milliamperes when not checked by a condenser, and with a potentiometer 18 interposed and adjusted to give the proper counter electromotive force, the results, in the case of wireless telegraph signals, were found to be remarkably good.

Fig. 21<sup>a</sup> shows a form of device wherein there may be special heating action of the positive electrode 11<sup>b</sup> on the negative electrode when the positive electrode is so designed with respect to the current flowing therethrough as to be highly heated. To this end the positive electrode is made small, so as to become heated by the passage of current from it, and is concentrically arranged around a projection 12<sup>a</sup> from the negative electrode, which it tends to heat, this projection tending to render stable the negative electrode reactions at its base. Such a positive electrode being constructed of platinum wire .057 inch in diameter and wound in a helix, having an inside diameter of 1/4 inch and being of two turns, will become heated with 1 ampere passing, and will work with 1-1/2 amperes, the bottom of the helix being substantially 1/8 inch from the level of the mercury.

In Fig. 21 the vapor device is shown with connections to a receiving circuit which may be useful with other forms of the device. The receiving conductor S is shown tuned as at 47 to a quarter wave length and the lateral conductor 45 leading to the electrode 13<sup>c</sup> of the vapor device is also tuned as at 46 to the same frequency. The ground connection G may be adjustable as at 48 and when the latter is used the circuit G, 48, 47, S will be the electrical equivalent of the circuit G, 48, 46, 45, 13<sup>c</sup>, so that there will be a crest of potential at 13<sup>c</sup>. In Fig. 22 the vapor device is shown as connected through a lateral conductor 54 with a closed tuned or resonant circuit, preferably tuned to the frequency of the received energy to be detected by means of a suitable adjustable inductance 51 and an adjustable condenser 52. The inductance 51 may be a length of straight wire, if desired. This closed tuned circuit is associated by means of a transformer 53 with a receiving wire S, and the parts may be all designed and operated in accordance with any of the principles well known in the art. The lateral conductor is shown adjusted as at 55 to the quarter wave length of the received energy so that there will be a resonant rise of potential at 13<sup>c</sup>. I may, however, use any of the devices and electric interlinkages now used in the art of wireless or wire telegraphy or telephony, and the specific circuits herein shown may be used in connection with other detectors.

Referring more particularly to the arrangement of Fig. 21, if the auxiliary electrode 13<sup>c</sup> be a circular plate 1-1/4 inches in diameter and its distance from the mercury negative electrode 2 be five inches and the main positive electrode be a ring of iron 1-1/8 inches outside diameter having a hole in the center 1/4 to 5/16 inch in diameter and if it be situated 3/8 of an inch from the surface of the mercury electrode, the container vessel being substantially from 2-1/2 to 3 inches in diameter, and properly exhausted, said vapor device will respond to extremely faint variations. Its sensitiveness may be increased by approaching an ordinary permanent magnet M somewhat in the manner shown in Fig. 22, the distance varying from close proximity to the device to 18 inches or so from it. A second magnet applied as shown in Fig. 22 may have a beneficial effect in tending to produce a resultant magnetic field wherein the lines of force lying in the path above 11 and 12 are at an angle of approximately 45 degrees from the normal vertical position of the negative electrode flame.

The various conditions of electrode size and location, main current flow, etc., may be so adjusted by trial as to cause a whistling sound or a regular note in the telephone when the magnet is at a suitable distance from the container. By then adjusting one of the variables, preferably the magnet, the device may be put in a critical or unstable condition, where faint signals may be indicated by perceptible changes in the quality, pitch, or intensity of such sound. In some cases the device may be put in a condition where there is little or no perceptible note audible and yet the balance is so delicate that the faintest disturbance, will precipitate the sound of the note, thus giving a strong signal where otherwise the effect might be nearly or quite inaudible.

The circular auxiliary electrode 13<sup>c</sup> is shown in Figs. 21 and 23 as flattened and arranged in a transverse plane with the flat surface approximately equidistant from the path between the main electrodes, so that almost all of the surface of the electrode exposed to the vapor lies in an approximately equipotential region of suitable current density. This arrangement has certain advantages where it is desired to use a fine adjustment of counter electromotive force of a potentiometer to secure the most sensitive condition for feeble signals. One reason for this is that if the auxiliary electrode is formed or arranged so that the exposed surface thereof extends through regions at materially different distances from the path between the main electrodes, different parts of such exposed surface may lie in regions of materially different current density. While this latter condition may not be objectionable for many purposes, it is sometimes found to be unsatisfactory for the finest work in connection with the faintest signals. One probable reason for this is that the condition of most extreme sensitiveness of the auxiliary electrode seems to depend upon getting an extremely fine balance of the counter electromotive force of the potentiometer against the electrical pressure at the surface of the auxiliary electrode. The latter pressure has for one important determining factor the current density in the portion of the vapor in contact with the electrode, and it seems to be a fact that if the auxiliary electrode is so formed or arranged that there are materially different current densities in the vapor adjacent different portions of its surface, the counter electromotive force of the potentiometer when set to a proper value for the current density adjacent one portion of the exposed surface, will be either too great or too small for other portions where the adjacent current density is of different value. On the other hand, if all portions of the exposed electrode surface are acted upon by vapor of substantially the same current density, the counter electromotive force may be very accurately adjusted to that current density, and such adjustment being perfect for one portion of the electrode is perfect for any other portion of the electrode. Another reason may be that a uniform density of current flow into and out of a considerable area of the electrode may be desirable. This result should be accomplished by the above arrangement of the auxiliary electrode, because by it the lengths and resistances of the vapor path from different portions of the surface of the electrode, will be substantially equal.

Fig. 23 illustrates an arrangement of three concentric auxiliary electrodes 13$^a$, 13$^b$, and 13$^c$ of different areas, preferably in the same plane, whereby the working surface area of auxiliary electrode may be rapidly and conveniently changed where varying indications are to be received. In connection with this device is shown a condenser 82 interposed in the aerial and having a shunt circuit to ground from the part of the aerial above the condenser through a small vapor gap or inductance for tapping off atmospheric charges from the aerial. I have employed for this purpose a vacuum tube constructed and arranged very much as shown in the drawings. The tube is about 3 inches long provided with disk electrodes 84, 85 and has a calcium compound therein intended to fluoresce upon passage of suitable current between the electrodes, the specific material in this particular case being a compound of calcium, probably calcined shells. This device was found to discharge at a pressure as low as 150 volts, and its action appears in no way to interfere with the impulses to be received by the receiving apparatus. The current supply between main electrodes is indicated as being from a commercial, direct current generator 86, with a shunt storage battery 8 adapted to be charged thereby.

In Fig. 24 I have shown a modified vapor device of the general type of construction hereinafter described, having an indicating circuit R, 19, between the main positive electrode 11$^a$ and the auxiliary electrode 13, and a circuit 8, 9 and 10 acting to supply current through the main positive electrode 11$^a$ into the main negative electrode 12, 2. The variations to be detected or translated are received through the wire 64, which may be connected with any desired wire or wireless circuit. The main positive electrode 11$^a$ of this vapor device instead of being a ring or perforated plate, is a disk or imperforate plate, preferably thin and about 1 to 1-3/16 inches in diameter. Its size and location with respect to the surface of the mercury and projection 12 are much the same as in other cases hereinbefore specified. When such disk is used instead of the ring or perforated plate, there are various modifications in the phenomena manifested, and the device is particularly sensitive to the influence of a magnetic field. The magnets seem to have the most marked effect in increasing sensitiveness, when they are arranged close to the container and so related thereto as to cause the magnetic lines from the poles thereof to lie in a plane of the axis of the device. In the arrangement shown in Fig. 24 the permanent magnets M', M$^2$ are symmetrically arranged in the same axial plane of the container with the south poles of each close to the negative electrode and the north poles close to the walls of the container about midway thereof and between the main positive electrode 11$^a$ and the auxiliary electrode 13. Such an arrangement seems to have very marked effect in increasing sensitiveness of the device and a slight movement of either of the poles of either of the magnets to or from the container or out of diametrical symmetrical relation causes far greater changes in the internal effects manifested in the receiver R, than do corresponding changes in the position of the magnet M in the case of the perforated plate or ring positive electrode of Fig. 22.

My experiments show that other things being equal, the perforated plate or ring positive electrode of Fig. 22 seems to give smoother effects more directly proportional to the received variations, whereas the disk arrangement as shown in Fig. 24 seems to give more distorted or disproportionally amplified indications. This quality of the disk or imperforate plate seems to render it particularly useful for receiving impulse signals, whereas the perforated plate seems to preserve the value of the amplified variations more accurately and to be better adapted to translate telephone variations.

In many cases the operation of the device is improved by maintaining a constant static charge of a desired pressure upon the aerial and upon the auxiliary electrode. This may be accomplished by using a condenser in the ground connection, Fig. 17, and employing a shunt vacuum device such as shown at 83, Fig. 23. If then the aerial be charged from the atmosphere or from any suitable source of potential, the gap at 84, 85 will act as a pressure escape valve to maintain the pressure within desired limits. The potential at which this valve will pass current may be modified by any suitable means as, for instance, by an external source of radioactivity, or ultraviolet or cathode rays.

The device described herein may be designed so as to be used for the purpose of receiving varying impulses of any frequency or strength and making them serviceable on direct current devices. It is also adapted for telephonic purposes, particularly for wireless telephony. For alternating currents the device may be constructed or arranged so as to be asymmetric, and may therefore be connected up either singly or in a pair in any of the well known ways, to take advantage of one or both halves of the alternating current to produce indications or effects in a telephone or other translating device such as a direct current indicator or instrument. With certain currents it may be made use of to take advantage of certain portions of a wave. The asymmetric resistance characteristics of the vapor device when constructed and operated as herein explained, may be made to persist for the highest frequencies as well as for the lowest voltages, and these characteristics may be relied upon for the rectification or asymmetric translation of variations of an extremely small fraction of a volt and of the highest frequency, thereby rendering possible the use of a direct current indicating instrument. I have found it desirable in order to fully utilize the asymmetric resistance characteristics of the device to so arrange the auxiliary electrode that it will act as an approximately no resistance positive electrode and as a substantially prohibitive negative electrode with respect to oscillations of the strength which it is desired to translate or detect by such device. When properly designed and arranged, the half waves or impulses coming through such electrode pass off freely into the gas or vapor, but the half waves or impulses tending to run in the opposite direction are substantially blocked, thus giving the rectifying effect necessary for operating the direct current or other instrument. This result may be achieved in connection with any of the typical circuits and devices shown herein. Referring for convenience to Fig. 21, the electrode 13$^c$ should be located at such distance from the main electrodes 11, 12 that the current flow therefrom and the current density of the vapor adjacent thereto is near the point where normal internal variations begin to cause disturbing indications in the instrument R. In a particular case this distance might be somewhere between 4 and 7 inches or, say, about 5 inches. The distance should be and in the case mentioned usually will be, such that the current density in the vapor adjacent the auxiliary electrode will not be sufficient to neutralize the opposition or reluctance of such electrode to act as a negative electrode with respect to impulses of the strength which it is desired to rectify. Under such conditions the flow of current from the auxiliary electrode into the vapor will be measured by a normal voltage drop at the auxiliary electrode which may be some 1, 2, 3, or more volts, according to the conditions. The application of electromagnets after the manner described in connection with Fig. 22 may serve to reduce this voltage drop to a fraction of a volt, say, for instance, to 7/10 volt or less. If now the potentiometer 18 be applied as a source of counter electromotive force, this drop may be counterbalanced by adjusting the potentiometer to a pressure of, say, 7/10 volt in the opposite direction. It is a peculiarity of such device, however, that in order to suppress the effects of internally originated disturbances in the telephone R, the counter electromotive force should be slightly greater than the original drop, or say somewhere about 75/100 volt, where the drop was found to be 7/10 volt. By still further experimental refinement of adjustment of this counter electromotive force, the voltage drop at the auxiliary electrode may be reduced practically to a zero, so that half waves or impulses of the smallest fraction of a volt, say, for instance, 1/10 volt to 1/100 volt, or less, will pass freely and practically unimpeded into the vapor, whereas the half waves or impulses tending to run in the opposite direction will be blocked and prevented from passing from the gas into the electrode 13$^c$, so that the effects of the variations are observable in a direct current instrument. The adjustable potentiometer thus arranged, is an accurate means for attaining at the electrode 13ᶜ, the conditions which will best serve the purpose of detecting alternating currents by a direct current instrument and yet not give rise to undue internally originated disturbances which might tend to mask the effects in the indicator R.

While I have last above described an arrangement of my device which is particularly efficient for rectifying, it will be understood that the device is so remarkably sensitive in such a variety of ways that it will act as a very good detector of feeble variations such as are characteristic of the receiving wires of ordinary commercial wireless telegraph systems, even when the adjustments are such that the asymmetric action is at a minimum.

With reference to magnets, it will be understood that the position and number of the magnetic lines and their action with respect to the negative electrode flame and other phenomena, may be varied by adjustment of any desired number of permanent magnets in a variety of ways. If desired the adjustment of strength of the magnets may be conveniently altered by using electromagnets in place of permanent magnets. By adjusting either independently or together, the current flow in the solenoids of one or more electromagnets used to produce a single resultant field, the direction and distribution of the lines of force in said resultant field may be changed as desired. Permanent magnets or other means for producing a magnetic field may be used to modify current flow at a positive or at an auxiliary electrode by being located at such electrode or electrodes. A starting band C³ of the type well known in the art may be applied at a main negative electrode, as in Fig. 2, or an auxiliary electrode, and may be used according to the practices well known in the art, or may be utilized as a means of operatively applying to the device, the variations to be translated or detected.

While my above described invention contemplates the utilization of reactions developed by current flow in a circuit which includes a gas or vapor as one of the conducting media, it will be understood that the special or auxiliary terminal and the circuit arrangements may be employed in connection with other conducting media carrying current supplied to the medium independently of the auxiliary terminal. In general the circuits whose reactions are to be utilized, should include differently conducting media affording variable electrical reactions of various classes, such as transition resistances, etc. I prefer a true conductor or conductor of the first class, such as ordinary conducting metals, and also a conductor of another class of conductivity at, for instance, one which is adapted to pass current after the manner of electrolytes or conducting fluids such as gases or vapors. A suitable source of electromotive force should be employed to maintain normal current flow in the circuit of the fluid medium, said current flow being preferably of relatively large quantity and low voltage. The indicator circuit should be a lateral or branch or parallel circuit including a part only of the fluid medium of said first mentioned circuit.

The source of variations to be translated may be a circuit of either forced variations or oscillatory variations and may be an open circuit, connected to ground or a capacity, or not, as desired. A closed circuit of either forced variations or oscillatory variations may be applied to advantage or any of the arrangements shown in each and all of the figures of the drawings by connecting the two sides of such closed circuit in the same way that the aerials S and ground G respectively are connected, or in any other desired way, all as will be well understood by those skilled in the art.

In the foregoing description and in the accompanying drawings I have specifically set forth only a few of the typical and desirable ways of arranging the aerial, indicating and direct current supply circuits. From these it will be evident to one skilled in the art that my vapor device is so sensitive that the variations to be detected or translated can hardly be applied to the same in such manner as not to produce some effect on the internal reactions and that those reactions will produce more or less pronounced sensible effects in the indicator whenever the latter is applied to the vapor device in such manner that impulses, direct currents, or displacement currents may flow therethrough in response to potential variations. The instrument should be designed or located so as not to be injured by the amperage of such current flow, and, in general, it is preferable to arrange the indicator and variation circuits in such manner that the variations to be detected may pass to the vapor device without being impeded or choked out by the indicator.

It will be observed that in the foregoing description of my broad invention and in the drawings illustrating the same, I have disclosed many specific devices and inventions which while adapted for or ancillary to the broad invention claimed herein, are too diverse to be claimed in detail in a single patent. Hence I have filed three divisional or continuing applications Serial Nos. 28,433; 28,434 and 28,435, filed May 15th, 1915, wherein I have reserved all divisible or separately patentable subject matter not specifically claimed herein.

I claim:

1. An apparatus for translating electrical variations comprising a translating device and a connection therefrom through an electrode to a body of conducting gas or vapor adapted to be maintained in a low resistance conducting condition, in combination with means for continuously maintaining current in said vapor independently of said electrode, and means for operatively applying variations to said apparatus, substantially as described.

2. An apparatus for translating electrical variations comprising a translating device and a connection therefrom through a true conductor of the first class to a conducting gas or vapor maintained in the low resistance conducting condition, in combination with means for continuously maintaining current in the gas or vapor independently of said connection through said true conductor, and means for operatively applying variations to said apparatus, substantially as described.

3. An apparatus for translating electrical variations comprising a translating device and a connection therefrom through an electrode to a body of conducting gas or vapor and means for limiting or preventing normal direct current flow through said electrode, in combination with means for continuously maintaining current in said vapor independently of said electrode, and means for operatively applying variations to said apparatus, substantially as described.

4. An apparatus for translating electrical variations comprising a translating device and a connection therefrom through one conducting medium to a gas or vapor maintained in the low resistance conducting condition, in combination with means for continuously maintaining current in the latter medium independently of said connection through said first mentioned medium and means for operatively applying said variations to said apparatus, substantially as described.

5. In an apparatus for translating electrical variations, two electric circuits each having an independent connection to a body of gas or vapor maintained in the low resistance conducting condition, common to both said circuits, in combination with means for continuously maintaining current in one of said circuits much greater than in the other, together with a translating device in the circuit of lesser current flow, substantially as described.

6. In an apparatus for translating electrical variations, two branch circuits, each having an independent connection and a common connection to a body of gas or vapor adapted to be maintained in a low resistance conducting condition, in combination with means for continuously maintaining greater current in one of said branches than in the other, together with a translating device in the latter branch, substantially as described.

7. An apparatus for translating electrical variations comprising a translating device and a connection therefrom through an electrode to a body of conducting gas or vapor adapted to be maintained in a low resistance conducting condition, in combination with a supply circuit and main electrodes for continuously maintaining current in said vapor independently of said first mentioned electrode, and means for operatively applying variations to said apparatus, substantially as described.

8. An apparatus for translating electrical variations comprising a translating device and a connection therefrom through an electrode to a conducting gas or vapor adapted to be maintained in a low resistance conducting condition, a supply circuit and main electrodes for maintaining current in said vapor independently of said electrode, the main negative electrode consisting of a liquid operating to pass currents of considerable quantity at low voltage, in combination with means for applying variations to said first mentioned electrode, substantially as described.

9. An apparatus for translating electrical variations, comprising a circuit consisting of suitably spaced true conductors of the first-class, an interposed gas or vapor maintained in the low resistance conducting condition, and a source of electro-motive force and current for continuously maintaining a flow of current through said medium, in combination with a terminal exposed to a portion of said medium out of the direct path of current therethrough, a translating device connected to said terminal and means for applying variations to said apparatus substantially as described.

10. An apparatus for translating electrical variations comprising a source of electromotive force and current, a circuit therefrom through suitably spaced true conductors of the first class and an interposed gas or vapor maintained in the low resistance conducting condition, in combination with a translating device, means for conductively connecting the latter to said medium independently of said first mentioned conductors, and means for applying variations directly to said conductively connecting means, substantially as described.

11. An apparatus for translating electrical variations comprising a source of electromotive force and currents, a circuit therefrom through suitably spaced true conductors of the first class and an interposed gas or vapor maintained in the low resistance conducting condition, in combination with a terminal exposed to a portion of said medium out of the direct path of the current therethrough, a translating device connected to said terminal, and means for applying said variations directly to said terminal, substantially as described.

12. An apparatus for detecting feeble electrical variations, comprising indicator, variation and main current supply connections, in combination with a hermetically sealed container inclosing a body of gas or vapor maintained in the low resistance conducting condition and provided with electrodes one of which contains mercury for maintaining normal current flow therein independently of the indicator connection, and means for modifying the effects on the indicator, of the normal internally originated variations attendant upon normal current flow, substantially as described.

13. An apparatus for detecting feeble electrical variations, comprising indicator, variation and main current supply connections, in combination with a hermetically sealed container having a high vacuum when cold and provided with electrodes for maintaining normal current flow therein, one of said electrodes containing mercury and being provided with a projection wetted thereby for rendering more stable the normal internally originated variations attendant upon normal current flow, substantially as described.

14. An apparatus for detecting feeble electrical variations, comprising indicator, variation and main current supply connections, in combination with a hermetically sealed container having a high vacuum when cold and provided with electrodes for maintaining normal current flow therein, one of said electrodes containing mercury and being provided with a projection wetted thereby and the other electrode being a plate arranged adjacent thereto for rendering more stable the normal internally originated variations attendant upon normal current flow, substantially as described.

15. An apparatus for detecting feeble electrical variations, comprising indicator, variation and main current supply connections, in combination with a hermetically sealed container having a high vacuum when cold and provided with electrodes for maintaining normal current flow therein, one of said electrodes having a projection and the other electrode being perforated and arranged opposite and adjacent said projection for rendering more stable the normal internally originated variations attendant upon normal current flow, substantially as described.

16. An apparatus for detecting feeble electrical variations, comprising indicator, variation and main current supply connections, in combination with a hermetically sealed container having a high vacuum when cold and provided with electrodes for maintaining normal current flow therein, one said electrode containing mercury and the other electrode being a plate arranged adjacent thereto for rendering more stable the normal internally originated variations attendant upon normal current flow, substantially as described.

17. An apparatus for detecting feeble electrical variations, comprising indicator, variation and main current supply connections, in combination with a hermetically sealed container inclosing a body of gas or vapor maintained in the low resistance condition and provided with main electrodes for continuously maintaining normal current flow therein, an auxiliary terminal for the indicator connection independent of the main current supply connection, and means for modifying the effects on the indicator, of the normal internally originated variations attendant upon normal current flow, substantially as described.

18. An apparatus for detecting feeble electrical variations, comprising indicator, variation and main current supply connections, in combination with a hermetically sealed container having a high vacuum when cold and provided with main electrodes for maintaining normal current flow therein, an auxiliary terminal for the indicator connection, one of said main electrodes containing mercury and being provided with a projection wetted thereby for rendering more stable the normal internally originated variations attendant upon normal current flow, substantially as described.

19. An apparatus for detecting feeble electrical variations, comprising indicator, variation and main current supply connections, in combination with a hermetically sealed container having a high vacuum when cold and provided with main electrodes for maintaining normal current flow therein, an auxiliary terminal for the indicator connection, one of said main electrodes containing mercury and being provided with a projection wetted thereby and the other main electrode being a plate arranged adjacent thereto, for the purpose described.

20. An apparatus for detecting feeble electrical variations, comprising indicator, variation and main current supply connections, in combination with a hermetically sealed container having a high vacuum when cold and provided with main electrodes for maintaining normal current flow therein, an auxiliary terminal for the indicator connection, one main electrode having a projection and the other electrode being perforated and arranged opposite and adjacent said projection for the purpose described.

21. An apparatus for detecting feeble electrical variations comprising indicator, variation and main current supply connections, in combination with a hermetically sealed container having a high vacuum when cold and provided with main electrodes for maintaining normal current flow therein, an auxiliary terminal for the indicator connection, one main electrode containing mercury and the other electrode being a plate arranged adjacent thereto, for the purpose described.

22. An apparatus for detecting feeble electrical variations comprising variation and main circuit connections, in combination with a gas or vapor device provided with main electrodes for maintaining normal current flow therein, an auxiliary terminal, and a circuit therefrom through an indicator and a source of counter electromotive force, substantially as described.

23. An apparatus for detecting feeble electrical variations, comprising variation and main circuit connections, in combination with a gas or vapor device provided with main electrodes for maintaining normal current flow therein, an auxiliary terminal, and a circuit therefrom through an indicator and a source of counter electromotive force to a main electrode, substantially as described.

24. An apparatus for detecting feeble electrical variations, comprising variation and main circuit supply connections, in combination with a hermetically sealed container having a high vacuum when cold and provided with main electrodes for maintaining normal current flow therein, an auxiliary terminal, and a circuit therefrom through an indicator and a source of counter electromotive force to a main electrode one of said main electrodes being provided with means for anchoring the negative electrode flame, substantially as described.

25. An apparatus for detecting feeble electrical variations, comprising variation and main circuit connections, in combination with a hermetically sealed container having a high vacuum when cold and provided with closely adjacent main electrodes for continuously maintaining normal current flow therein, a remote auxiliary terminal, and a circuit therefrom including an indicator and a source of counter electromotive force to a main electrode, substantially as described.

26. An apparatus for detecting feeble electrical variations, comprising variation and main circuit connections, in combination with a hermetically sealed container having a high vacuum when cold and provided with closely adjacent main electrodes for maintaining normal currents of considerable quantity therein, a remote auxiliary terminal, and a circuit therefrom including an indicator and a source of counter electromotive force to a main electrode, the main negative electrode being of mercury and continuously maintained in the broken down state by said quantity currents, substantially as described.

27. An apparatus for detecting feeble electrical variations, comprising variation and main circuit connections, in combination with a hermetically sealed container having a high vacuum when cold and provided with main electrodes for maintaining normal current flow therein, an auxiliary terminal, a circuit therefrom including an indicator, and a source of counter electromotive force to a main electrode, and means for modifying the effects on the indicator, of the normal internally originated variations attendant upon normal current flow, substantially as described.

28. An apparatus for detecting feeble electrical variations, comprising variation and main circuit connections, in combination with a hermetically sealed container having a high vacuum when cold and provided with main electrodes for maintaining normal current flow therein, an auxiliary terminal, a circuit therefrom including an indicator and a source of counter electromotive force to a main electrode, one of said main electrodes containing mercury and being provided with a projection wetted thereby, substantially as described.

29. An apparatus for detecting feeble electrical variations, comprising variation and main circuit connections, in combination with a hermetically sealed container having a high vacuum when cold and provided with main electrodes for maintaining normal current flow therein, an auxiliary terminal, a circuit therefrom including an indicator and a source of counter electromotive force to a main electrode, one of said electrodes being provided with a projection, and the other electrode being perforated and arranged opposite and adjacent said projection, for the purposes described.

30. An apparatus for detecting feeble electrical variations, comprising variation and main circuit connections, in combination with a hermetically sealed container having a high vacuum when cold and provided with main electrodes for maintaining normal current flow therein, an auxiliary terminal, a circuit therefrom including an indicator and a source of counter electromotive force to a main electrode, one said electrode containing mercury and the other electrode being a plate arranged adjacent thereto, for the purposes described.

31. An apparatus for detecting feeble electrical variations, comprising indicator, variation and main current supply connections, in combination with a hermetically sealed container having a high vacuum when cold and provided with main electrodes for maintaining normal current flow therein, one of said main electrodes being provided with means for anchoring the negative electrode flame, thereby rendering more stable the normal internally originated variations attendant upon normal current flow, substantially as described.

32. An apparatus for detecting feeble electrical variations, comprising indicator, variation and main current supply connections, in combination with a hermetically sealed container having a high vacuum when cold and provided with main electrodes for maintaining normal current flow therein, an auxiliary terminal for the indicator connection, one of said main electrodes being provided with means for anchoring the negative electrode flame, thereby rendering more stable the normal internally originated variations attendant upon normal current flow, substantially as described.

33. An apparatus for detecting feeble electrical variations, comprising indicator, variation and main current supply connections, in combination with a hermetically sealed container having a high vacuum when cold and provided with main electrodes for maintaining normal current flow therein, one of said main electrodes containing mercury and being provided with means for anchoring the negative electrode flame and the other main electrode being arranged adjacent thereto, for the purpose described.

34. An apparatus for detecting feeble electrical variations, comprising indicator, variation and main current supply connections, in combination with a hermetically sealed container having a high vacuum when cold and provided with main electrodes for maintaining normal current flow therein, an auxiliary terminal for the indicator connection, one of said main electrodes containing mercury and being provided with means for anchoring the negative electrode flame and the other main electrode being arranged adjacent thereto, for the purpose described.

35. An apparatus for detecting feeble electrical variations, comprising indicator, variation and main current supply connections, in combination with a hermetically sealed container having a high vacuum when cold and provided with main electrodes for maintaining normal current flow therein, one main electrode having means for anchoring the negative electrode flame, and the other electrode being perforated and arranged opposite and adjacent said anchoring means, for the purpose described.

36. An apparatus for translating electrical variations comprising indicator, variation and main current supply connections, in combination with an evacuated container provided with electrodes for maintaining normal current flow therein, the positive electrode extending into the dark space adjacent to the negative electrode.

37. An apparatus for translating electrical variations comprising indicator, variation and main current supply connections, in combination with a gas or vapor tube provided with electrodes for maintaining normal current flow therein, the positive electrode extending into the dark space adjacent to the negative electrode, and one of them being of vaporizable material.

38. An apparatus for translating electrical variations comprising indicator, variation and main current supply connections, in combination with a gas or vapor tube, provided with electrodes for maintaining normal current flow therein, the positive electrode extending into the dark space adjacent to the negative electrode, the negative electrode being of vaporizable material and provided with means for anchoring the negative electrode flame.

39. An apparatus for translating electrical variations, comprising an evacuated container, main and auxiliary electrodes, circuit connections therefor, and an indicator, operatively associated therewith, in combination with a capacity area in inductive relation to said container, and a source of electrical variations connected to said capacity area, for the purpose described.

40. An apparatus for detecting feeble electrical variations comprising a hermetically sealed container having a high vacuum when cold and provided with main electrodes, an auxiliary terminal, and a circuit therefrom through an indicator, in combination with a capacity area in operative relation to said container, and a main circuit for maintaining current flow through said main electrodes of sufficient quantity to maintain the main negative electrode in the broken down state, substantially as described.

41. An apparatus for detecting feeble electrical variations comprising a hermetically sealed container having a high vacuum when cold and provided with main electrodes and means for rendering stable the normal internal reactions, an auxiliary terminal, and a circuit therefrom through an indicator, in combination with a capacity area in inductive relation to said container, and a main circuit for maintaining current flow through said main electrodes of sufficient quantity to maintain the main negative electrode in the broken down state, substantially as described.

42. In an apparatus for detecting electrical variations, a gas or vapor device comprising a hermetically sealed container having a high vacuum when cold, main electrodes therein, a source of electromotive force and current for said main electrodes, adapted to maintain said vapor in conducting condition and said negative electrode in the broken down state by flow of current from the former into the latter, a plurality of auxiliary terminals, and means for applying said variations to said apparatus, substantially as described.

43. In an apparatus for detecting electrical variations, a gas or vapor device comprising a hermetically sealed container having a high vacuum when cold, main electrodes and separate auxiliary terminals therein, a supply circuit for said main electrodes, adapted to maintain normal current flow in said gas or vapor independently of said auxiliary terminals, an indicating circuit connected between said terminals, and means for applying said variations to said apparatus, substantially as described.

44. A vapor device for detecting electrical variations, comprising an electrode, an indicator in the circuit thereof and means for continuously passing current through the vapor independently of said electrode, substantially as described.

45. A vapor device for detecting electrical variations and means whereby the negative electrode resistance at one electrode is maintained in a state of low resistance by current passing from the vapor to said electrode, and an additional electrode subjected to a source of electrical variation and means in connection therewith for detecting the same, substantially as described.

46. In an apparatus for detecting electrical variations, a gas or vapor device comprising an indicator, in combination with a hermetically sealed container inclosing a body of gas or vapor adapted to be maintained in a low resistance conducting condition and having a high vacuum when cold, and means for passing continuous direct current through said body of gas or vapor regularly and uniformly without causing internally originated variations of magnitude sufficient to affect the operation of the indicator associated therewith, substantially as described.

47. An apparatus for detecting electrical variations, comprising variation and main circuit connections, in combination with a mercury vapor device having two main electrodes including a mercury negative electrode, the main negative electrode being continuously maintained in the broken down state of resistance and passing continuously direct current, in combination with a magnet having one pole arranged adjacent to said main negative electrode, substantially as described.

48. An apparatus for detecting electrical variations, comprising variation and main circuit connections in combination with a gas or vapor device having two adjacent main electrodes, the main negative electrode being continuously maintained in the broken down state of resistance and passing continuously direct current, in combination with a magnetic field for said device, substantially as described.

49. An apparatus for detecting feeble electrical variations, comprising a hermetically sealed container provided with main electrodes and a source of current for maintaining normal current flow therethrough, an auxiliary terminal and a circuit therefrom through an indicator, one electrode being provided with a projection and the other electrode being perforated and arranged opposite and adjacent said projection, in combination with a magnetic field arranged with its magnetic lines in the region of the main negative electrode and lying in a predetermined direction with respect to the surface of the negative electrode, substantially as described.

50. An apparatus for detecting feeble electrical variations, comprising a hermetically sealed container having a high vacuum when cold and provided with main electrodes and a source of current for maintaining normal current flow therethrough, an auxiliary terminal and a circuit therefrom through an indicator, the main negative electrode containing mercury and the other electrode being arranged adjacent thereto, in combination with a magnetic field arranged with its magnetic lines lying in the path between said main electrodes and having a predetermined direction with respect to the surface of said main negative electrode, substantially as described.

51. An apparatus for detecting feeble electrical variations, comprising a hermetically sealed container having a high vacuum when cold and provided with main electrodes and a source of current for maintaining normal current flow therethrough, an auxiliary terminal and a circuit therefrom through an indicator, one main electrode having means for anchoring the negative electrode flame, and the other electrode being perforated and arranged opposite and adjacent said anchoring means, in combination with a magnetic field arranged with magnetic lines lying in the path between said main electrodes and at an inclination to the direction thereof, substantially as described.

52. In an apparatus for relaying or translating electrical variations of potential, an active vapor device in combination with a lateral conductor from a source of variation so related to said vapor device as to vary the lateral distribution of current in said device and to be itself affected by such variation of current distribution, substantially as described.

53. The method of utilizing reactions caused by current flow in a gas or vapor conducting medium, which method consists in causing said reactions to be common to two or more electric circuits, one circuit continuously operating and carrying more current than the other and the second operatively associated with a suitable indicating instrument or translating device; affecting said reactions by electric variations and utilizing the resulting variations in said second circuit to produce an indication or effect, substantially as described.

54. The method of utilizing a gas or vapor device for detecting electrical variations, which method consists in passing current continuously through main electrodes and the intervening gas or vapor of such device in such quantity as to maintain the negative electrode continuously in a broken down state, applying the variations to be detected to vary the electrical reactions in said device, exposing an auxiliary terminal to a region of suitable normal current density in said gas or vapor, and utilizing the resulting electrical variations at said auxiliary terminal to produce an indication or effect, substantially as described.

55. The method of utilizing a gas or vapor device for detecting electrical variations, which method consists in passing current continuously through main electrodes and the intervening gas or vapor of such device in such quantity as to maintain the negative electrode continuously in a broken down state, applying the variations to be detected to vary the current distribution in said gas or vapor, exposing an auxiliary terminal to a region of suitable normal current density in said gas or vapor, and utilizing the resulting electrical variations at said auxiliary terminal to produce an indication or effect, substantially as described.

56. The method of translating electrical variations of a circuit, which consists in applying the variations of electrical potential in lateral conductors from said circuit to vary the current distribution in a vacuum tube continuously maintained in an active state by continuous direct current flow, and utilizing the resulting variation of current distribution to reproduce in a lateral circuit inductive effects which are a reproduction of the variation of the exciting potential, substantially as described.

57. The method of utilizing the reactions at an electrode in a gas or vapor device for translating electrical variations, which method consists in passing a current through the gas or vapor in the device, locating an exposed surface of the electrode within the device in such relation with respect to the density of the current in vapor adjacent to it as to cause the desired reaction to be present.

58. The method of utilizing the reactions at an electrode in a gas or vapor device for translating electrical variations, which method consists in locating said electrode in relation to two other electrodes carrying current so that the gas adjacent to said first mentioned electrode will have such current density as to develop translating reactions, and applying said variations to said device, substantially as described.

59. The method of utilizing the reactions at an electrode in a gas or vapor device for translating electrical variations, which method consists in locating said electrode in relation to two other electrodes carrying current so that the current density in the gas adjacent to said first mentioned electrode will develop the desired translating reactions and operatively associating the electrical variations therewith, substantially as described.

60. The method of utilizing a gas or vapor apparatus for the purpose of detecting electrical variations, which consists in causing the vapor device to be approximately at its lowest state of resistance with respect to passing current, and associating therewith an auxiliary electrode in such relation to the conducting vapor as to have a predetermined current density in the vapor adjacent thereto, and utilizing the reactions at said electrode, substantially as described.

61. The method of utilizing the reactions of an electrode in a gas or vapor device for translating electrical variations, which method consists in locating said electrode in such relation to a vapor maintained in a conducting state by flow of current supplied independently of said electrode that its reactions are developed and rendered sensitive to said variations and utilizing said reactions to energize an indicator in the circuit of said electrode, substantially as described.

62. The method of utilizing the reactions at an electrode in a gas or vapor device supplied with currents and maintained continuously conducting independently of said electrode, which method consists in correlating the location of the exposed surface of the electrode and the distribution of the independently supplied current so as to establish a desired density of such current adjacent such exposed surface, and applying said variations to said device, substantially as described.

63. The method of utilizing the reactions at an electrode in a gas or vapor device supplied with currents and maintained continuously conducting independently of said electrode, which method consists in correlating the location of the exposed surface of the electrode, the distribution of the independently supplied current and the electromotive force of the circuit of said electrode so as to establish the desired reactions at said electrode, and applying said variations to said device, substantially as described.

64. In a gas or vapor apparatus having a negative electrode adapted to endure when the said electrode is operated in the broken down low resistance state, a positive electrode close to said negative electrode so that the reactions are modified and made of lower resistance than in case of normal spacing, in which the electrodes are relatively far apart, and a third electrode so located with respect to the density of the current passing in the device through the circuit of said first mentioned electrodes as to have its reactions at or near the point where its opposition to the passage of negative leakage current approaches a maximum, substantially as described.

65. A gas or vapor device having a negative electrode capable of being operated in the low resistance or broken down state, a positive electrode at which the normal reactions are modified and approach a minimum resistance, and a third electrode located with respect to current flow in the circuit of the last two electrodes so that its reactions will present an approximately prohibitive negative electrode resistance to passage of current from the vapor into said third electrode and an approximately minimum resistance to passage of currents in the opposite direction, substantially as described.

66. A gas or vapor device having a negative electrode capable of being operated in the low resistance or broken down state, a positive electrode at which the normal reactions are modified and approach a minimum resistance, and a third electrode located with respect to current flow in the circuit of the last two electrodes so that its reactions will present an approximately prohibitive negative electrode resistance to passage of current from either of the other electrodes into said third electrode and an approximately minimum resistance to passage of currents in the opposite direction, substantially as described.

67. An apparatus for detecting electrical variations, comprising variation and main circuit connections in combination with a gas or vapor device having a main positive electrode and a main negative electrode, the latter being in the broken down state of resistance and passing current, said electrodes being formed and arranged so as to afford a short low resistance path for the main current through the vapor and to render normally originated internal variations relatively small as compared with the effects of the electrical variations to be detected, substantially as described.

68. An apparatus for detecting electrical variations, comprising variation and main circuit connections in combination with a gas or vapor device having a main positive electrode and a main negative electrode, said electrodes being formed and arranged so as to afford a short low resistance path for the main current through the vapor and to render normally originated internal variations relatively small as compared with the effects of the electrical variations to be detected, substantially as described.

69. An apparatus for detecting electrical variations, comprising variation and main circuit connections in combination with a gas or vapor device having a main positive electrode and a main negative electrode, the latter being in the broken down state of resistance and passing current, said electrodes being formed and arranged so as to afford a short low resistance path for the main current through the vapor and to render normally originated internal variations relatively small as compared with the effects of the electrical variations to be detected, and means for controlling the direction of the negative electrode flame to still further reduce the resistance of the path between said main electrodes, substantially as described.

70. An apparatus for detecting electrical variations, comprising variation and main circuit connections in combination with a gas or vapor device having a main positive electrode and a main negative electrode, the latter being in the broken down state of resistance and passing current, said electrodes being formed and arranged so as to afford a short low resistance path for the main current through the vapor and to render normally originated internal variations relatively small as compared with the effects of the electrical variations to be detected, means for controlling the direction of the negative electrode flame to still further reduce the resistance of the path between said main electrodes, and means in said main circuit connections for steadying the current flow therethrough, substantially as described.

71. An apparatus for detecting electrical variations, comprising variation and main circuit connections in combination with a gas or vapor device having a main positive electrode and a main negative electrode, the latter being in the broken down state of resistance and passing current, said electrodes being formed and arranged so as to afford a short low resistance path for the main current through the vapor and to render normally originated internal variations relatively small as compared with the effects of the electrical variations to be detected, means for controlling the direction of the negative electrode flame to still further reduce the resistance of the path between said main electrodes, together with an auxiliary terminal exposed within said container and a circuit therefrom through an indicator to a main electrode, and means for controlling the current in said main supply and indicator circuits, substantially as described.

72. An apparatus for detecting electrical variations, comprising variation and main circuit connections in combination with a gas or vapor device having a main positive electrode and a main negative electrode, the latter being in the broken down state of resistance and passing current, said electrodes being formed and arranged so as to afford a short low resistance path for the main current through the vapor and to render normally originated internal variations relatively small as compared with the effects of the electrical variations to be detected, means for controlling the direction of the negative electrode flame to still further reduce the resistance of the path between said main electrodes, means in said main circuit connections for steadying the current flow therethrough, together with an auxiliary terminal exposed within said container and a circuit therefrom through an indicator to a main electrode, and means for controlling the current in said main supply and indicator circuits, substantially as described.

73. A vapor device for detecting electrical variations comprising a container, main electrodes therein and an auxiliary electrode, said auxiliary electrode being formed and arranged so that the major portion of surface exposed to the current carrying vapor within said container lies in a region or zone of approximately uniform current density, substantially as described.

74. A vapor device for detecting electrical variations comprising a container, main electrodes therein, and an auxiliary electrode, said auxiliary electrode being formed and arranged so that the major portion of surface exposed to the current carrying vapor within said container is approximately equidistant from said main electrodes and the direct path between them, substantially as described.

75. A vapor device for detecting electrical variations comprising a container, main electrodes therein and an auxiliary electrode, said auxiliary electrode having a suitable area exposed to the vapor in an approximately equipotential region of suitable current density, in combination with means for impressing upon said terminal a suitably adjusted counter electromotive force, substantially as described.

76. A vapor device for detecting electrical variations comprising a container, adjacent main electrodes therein and an auxiliary electrode relatively remote from the direct path of current flow between said main electrodes, said auxiliary electrode being flattened and arranged with its flattened surface directed toward said main electrodes and the path between them, substantially as described.

77. A vapor device for detecting electrical variations comprising a container, adjacent main electrodes therein and an auxiliary electrode relatively remote from the direct path of current flow between said main electrodes, said auxiliary electrode having a suitable area exposed to the vapor in an approximately equipotential region of suitable current density, in combination with means for impressing upon said terminal a suitably adjusted counter electromotive force, substantially as described.

78. An apparatus for detecting electrical variations, comprising variation and main circuit connections in combination with a gas or vapor device having a main positive electrode and a main negative electrode, the latter being in the broken down state of resistance and passing current, said electrodes being formed and arranged so as to afford a short low resistance path for the main current through the vapor and to render normally originated internal variations relatively small as compared with the effects of the electrical variations to be detected, means for controlling the direction of the negative electrode flame to still further reduce the resistance of the path between said main electrodes, together with a flattened auxiliary terminal exposed within said container relatively remote from and having its flattened surface directed toward said main electrodes, a circuit from said auxiliary terminal through an indicator to a main electrode, and means for controlling the current in said main supply and indicator circuits, substantially as described.

79. An apparatus for detecting electrical variations, comprising variation and main circuit connections in combination with a gas or vapor device having a main positive electrode and a main negative electrode, the latter being in the broken down state of resistance and passing current, said electrodes being formed and arranged so as to afford a short low resistance path for the main current through the vapor and to render normally originated internal variations relatively small as compared with the effects of the electrical variations to be detected, means in said main circuit connections for steadying the current flow therethrough, together with an auxiliary terminal exposed within said container, a circuit therefrom through an indicator to a main electrode, and means for controlling the current in said main supply circuit and a source of counter-electromotive force in said indicator circuit, substantially as described.

80. An apparatus for detecting feeble electrical variations comprising a hermetically sealed container having a high vacuum when cold and provided with main electrodes, an auxiliary terminal, and a circuit therefrom through an indicator, in combination with a capacity area in operative relation to said container, and a main circuit for maintaining current flow through said main electrodes independently of said auxiliary terminal.

81. The method of utilizing the reactions at an electrode in a gas or vapor device supplied with currents independently of said electrode, which method consists in correlating the location of the exposed surface of the electrode and the distribution of the independently supplied current so as to have its reactions at or near the point where its opposition to the passage of negative current aproaches a maximum, substantially as described.

82. The method of utilizing the reactions at an electrode in a gas or vapor device supplied with currents independently of said electrode, which method consists in correlating the location of the exposed surface of the electrode and the distribution of the independently supplied current so as to present an approximately prohibitive negative electrode resistance to passage of current from the vapor into said third electrode and an approximately minimum resistance to passage of currents in the opposite direction, substantially as described.

83. The method of utilizing the reactions at an electrode in a gas or vapor device supplied with currents independently of said electrode, which method consists in correlating the location of the exposed surface of the electrode, the distribution of the independently supplied current and the electromotive force of the circuit of said electrode so as to have its reactions at or near the point where its opposition to the passage of negative current approaches a maximum, substantially as described.

84. The method of utilizing the reactions at an electrode in a gas or vapor device supplied with currents independently of said electrode, which method consists in correlating the location of the exposed surface of the electrode, the distribution of the independently supplied current and the electromotive force of the circuit of said electrode so as to present an approximately prohibitive negative electrode resistance to passage of current from the vapor into said third electrode and an approximately minimum resistance to passage of currents in the opposite direction, substantially as described.

85. An apparatus for detecting feeble electrical variations, comprising indicator, variation and main current supply connections, in combination with a hermetically sealed container having a high vacuum when cold and provided with main electrodes for maintaining normal current flow therein, an auxiliary terminal for the indicator connection, one of said main electrodes containing mercury and being provided with means for rendering more stable the normal internally originated variations attendant upon normal current flow, substantially as described.

86. A gas or vapor device having two electrodes and a circuit thereto including a continuously acting source of direct current, means for rendering stable the reactions at the negative electrode, and a third electrode associated with a source of electric variations, in combination with a consumption circuit operatively related to said device, substantially as described.

87. A gas or vapor device having two electrodes and a supply circuit thereto, means for reducing the resistance at the positive electrode, and a third electrode associated therewith, in combination with a circuit for affecting said third electrode by electrical variations and a third circuit for the translated variations, substantially as described.

88. A gas or vapor device having two main electrodes and a circuit for supplying continuous direct current thereto, means for rendering stable the electrical reactions at the positive electrode and a third electrode associated therewith, in combination with a circuit for affecting said third electrode by electrical variations, and a third circuit for the translated variations, substantially as described.

89. A gas or vapor device having two main electrodes and a circuit for supplying continuous direct current thereto, means for rendering stable the electrical reactions at said electrodes and a third electrode associated with a source of electrical variations, in combination with a consumption circuit connected to said third electrode.

90. A vapor device containing two electrodes included in an active electrical circuit and being in a low resistance state with respect to normal reactions of such electrodes, in combination with another electrode so located with respect to current flow from said two electrodes as to approximate a state of substantially prohibitive negative electrode reactions and of minimum positive electrode reactions with respect to a circuit including it and one of the other electrodes, in combination with a source of electrical variation and means for utilizing the resulting translated variations, substantially as described.

91. A vapor device containing two electrodes included in an active electrical circuit and being in a low resistance state with respect to normal reactions of such electrodes, in combination with another electrode so located with respect to current flow from said two electrodes as to approximate a state of substantially prohibitive negative electrode reactions and of minimum positive electrode reactions with respect to a circuit including it and one of the other electrodes, in combination with a source of electrical variations and a direct current means for utilizing current due to said translated variations in the circuit of the third electrode, substantially as described.

92. The method of utilizing the reactions at an electrode in a gas or vapor device supplied with currents independently of said electrode, which method consists in continuously passing direct current through main electrodes and a vapor path within such device so as to maintain the main negative electrode in the broken down state and the device in the low resistance condition, correlating the location of the exposed surface of the electrode and the distribution of the independently supplied current so as to establish a desired density of such current adjacent such exposed surface, and applying electric variations to said device, substantially as described.

93. The method of utilizing the reactions at an electrode in a gas or vapor device supplied with currents independently of said electrode, which method consists in continuously passing direct current through main electrodes and a vapor path within such device so as to maintain the main negative electrode in the broken down state and the device in the low resistance condition, correlating the location of the exposed surface of the electrode, the distribution of the independently supplied current and the electromotive force of the circuit of said electrode so as to establish the desired reactions at said electrode, and applying electric variations to said device, substantially as described.

Signed at New York city in the county of New York and State of New York this 29th day of March, A. D. 1907.

PETER COOPER HEWITT.

Witnesses:
WALTER E. F. BRADLEY,
IRVING M. OBRIEGHT.